United States Patent
Hood et al.

(10) Patent No.: US 7,809,683 B2
(45) Date of Patent: Oct. 5, 2010

(54) LIBRARY THAT INCLUDES MODIFIABLE INDUSTRIAL AUTOMATION OBJECTS

(75) Inventors: Gavan W. Hood, Upper Lockyer (AU); Ralph Kappelhoff, Milwaukee, WI (US); Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 320 days.

(21) Appl. No.: 11/239,567

(22) Filed: Sep. 29, 2005

(65) Prior Publication Data

US 2006/0259500 A1  Nov. 16, 2006

Related U.S. Application Data

(60) Provisional application No. 60/680,682, filed on May 13, 2005.

(51) Int. Cl.
*G06F 7/00* (2006.01)
*G06F 17/00* (2006.01)

(52) U.S. Cl. .................. 707/632; 707/705; 707/758

(58) Field of Classification Search ............... 707/632, 707/705, 758
See application file for complete search history.

(56) References Cited

U.S. PATENT DOCUMENTS

| | | | |
|---|---|---|---|
| 4,268,901 A | 5/1981 | Subrizi et al. | |
| 4,347,564 A | 8/1982 | Sugano et al. | |
| 4,623,964 A | 11/1986 | Getz et al. | |
| 4,990,838 A | 2/1991 | Kawato et al. | |
| 5,072,374 A | 12/1991 | Sexton et al. | |
| 5,185,708 A | 2/1993 | Hall et al. | |
| 5,253,184 A | 10/1993 | Kleinschnitz | |
| 5,282,244 A | 1/1994 | Fuller et al. | |
| 5,301,320 A | 4/1994 | McAtee et al. | |
| 5,446,868 A | 8/1995 | Gardea et al. | |
| 5,455,775 A | 10/1995 | Huber et al. | |
| 5,485,620 A | 1/1996 | Sadre et al. | |
| 5,504,891 A | 4/1996 | Motoyama et al. | |
| 5,537,585 A | 7/1996 | Blickenstaff et al. | |
| 5,572,731 A | 11/1996 | Morel et al. | |
| 5,611,059 A | 3/1997 | Benton et al. | |
| 5,619,724 A | 4/1997 | Moore | |
| 5,634,048 A | 5/1997 | Ryu et al. | |

(Continued)

OTHER PUBLICATIONS

SOFA/DCUP: Architecture for Component Trading and Dynamic Updating, by Plasil et al., Proceedings of the International Conference on Configurable Distributed Systems, p. 43, 1998, ISBN:0-8186-8451-8.*

(Continued)

*Primary Examiner*—Jay Morrison
(74) *Attorney, Agent, or Firm*—Turocy & Watson LLP; William R. Walbrun; John M. Miller

(57) ABSTRACT

An industrial automation object library system comprises a data store that is accessible by way of the Internet. The data store retains an object that is executable by a programmable logic controller, wherein the object conforms to a hierarchically structured data model. A location component associated with the data store accesses the data store to locate the object upon receipt of a request for the object. In one particular example, the hierarchically structured data model can be based at least in part upon ISA S95 and/or ISA S88.

28 Claims, 15 Drawing Sheets

U.S. PATENT DOCUMENTS

| | | |
|---|---|---|
| 5,644,740 A | 7/1997 | Kiuchi |
| 5,675,748 A | 10/1997 | Ross |
| 5,715,413 A | 2/1998 | Ishai et al. |
| 5,721,905 A | 2/1998 | Elixmann et al. |
| 5,761,499 A | 6/1998 | Sondregger |
| 5,790,935 A * | 8/1998 | Payton ........................ 725/91 |
| 5,797,137 A | 8/1998 | Golshani et al. |
| 5,812,773 A | 9/1998 | Norin |
| 5,828,851 A | 10/1998 | Nixon et al. |
| 5,832,486 A | 11/1998 | Itoh et al. |
| 5,838,563 A | 11/1998 | Dove et al. |
| 5,848,273 A | 12/1998 | Fontana et al. |
| 5,862,052 A | 1/1999 | Nixon et al. |
| 5,884,025 A | 3/1999 | Baehr et al. |
| 5,884,033 A | 3/1999 | Duvall et al. |
| 5,913,029 A | 6/1999 | Shostak |
| 5,924,094 A | 7/1999 | Sutter |
| 5,936,539 A | 8/1999 | Fuchs |
| 5,940,294 A | 8/1999 | Dove |
| 5,940,854 A | 8/1999 | Green, Jr. et al. |
| 5,951,440 A | 9/1999 | Reichlinger |
| 5,960,420 A | 9/1999 | Leymann et al. |
| 5,966,705 A | 10/1999 | Koneru |
| 5,970,494 A | 10/1999 | Velissaropoulos et al. |
| 5,978,577 A | 11/1999 | Rierden et al. |
| 5,980,078 A | 11/1999 | Krivoshein et al. |
| 5,983,016 A | 11/1999 | Brodsky et al. |
| 6,011,899 A | 1/2000 | Ohishi et al. |
| 6,032,208 A | 2/2000 | Nixon et al. |
| 6,044,217 A | 3/2000 | Brealey et al. |
| 6,061,740 A | 5/2000 | Ferguson et al. |
| 6,063,129 A | 5/2000 | Dadd et al. |
| 6,081,899 A | 6/2000 | Byrd |
| 6,098,116 A | 8/2000 | Nixon et al. |
| 6,101,531 A | 8/2000 | Eggleston et al. |
| 6,157,864 A | 12/2000 | Schwenke et al. |
| 6,195,591 B1 | 2/2001 | Nixon et al. |
| 6,208,987 B1 | 3/2001 | Nihei |
| 6,234,899 B1 | 5/2001 | Nulph |
| 6,266,726 B1 | 7/2001 | Nixon et al. |
| 6,268,853 B1 | 7/2001 | Hoskins et al. |
| 6,275,977 B1 | 8/2001 | Nagai et al. |
| 6,308,168 B1 | 10/2001 | Dovich et al. |
| 6,308,224 B1 | 10/2001 | Leymann et al. |
| 6,311,187 B1 | 10/2001 | Jeyaraman |
| 6,327,511 B1 | 12/2001 | Naismith et al. |
| 6,336,152 B1 | 1/2002 | Richman et al. |
| 6,356,920 B1 | 3/2002 | Vandersluis |
| 6,377,957 B1 | 4/2002 | Jeyaraman |
| 6,393,566 B1 | 5/2002 | Levine |
| 6,398,106 B1 | 6/2002 | Ulvr et al. |
| 6,409,082 B1 | 6/2002 | Davis et al. |
| 6,411,987 B1 | 6/2002 | Steger et al. |
| 6,415,983 B1 | 7/2002 | Ulvr et al. |
| 6,425,051 B1 | 7/2002 | Burton et al. |
| 6,438,744 B2 | 8/2002 | Toutonghi et al. |
| 6,445,963 B1 | 9/2002 | Blevins et al. |
| 6,446,202 B1 | 9/2002 | Krivoshein et al. |
| 6,457,053 B1 | 9/2002 | Satagopan et al. |
| 6,469,986 B1 | 10/2002 | Lecheler et al. |
| 6,473,656 B1 | 10/2002 | Langels et al. |
| 6,477,435 B1 | 11/2002 | Ryan et al. |
| 6,484,061 B2 | 11/2002 | Papadopoulos et al. |
| 6,501,996 B1 | 12/2002 | Bieber |
| 6,505,247 B1 | 1/2003 | Steger et al. |
| 6,510,352 B1 | 1/2003 | Badavas et al. |
| 6,539,271 B2 | 3/2003 | Lech et al. |
| 6,539,430 B1 | 3/2003 | Humes |
| 6,539,458 B2 | 3/2003 | Holmberg |
| 6,615,091 B1 | 9/2003 | Birchenough et al. |
| 6,631,519 B1 | 10/2003 | Nicholson et al. |
| 6,643,555 B1 | 11/2003 | Eller et al. |
| 6,661,426 B1 | 12/2003 | Jetha et al. |
| 6,664,981 B2 | 12/2003 | Ashe et al. |
| 6,681,227 B1 | 1/2004 | Kojima et al. |
| 6,687,817 B1 | 2/2004 | Paul |
| 6,697,797 B1 | 2/2004 | Hoggatt et al. |
| 6,704,746 B2 | 3/2004 | Sokolov et al. |
| 6,714,949 B1 | 3/2004 | Frey, Jr. |
| 6,714,981 B1 | 3/2004 | Skaggs |
| 6,738,821 B1 | 5/2004 | Wilson et al. |
| 6,745,089 B2 | 6/2004 | Rasmussen et al. |
| 6,748,486 B2 | 6/2004 | Burton et al. |
| 6,751,634 B1 | 6/2004 | Judd |
| 6,758,403 B1 | 7/2004 | Keys et al. |
| 6,760,721 B1 | 7/2004 | Chasen et al. |
| 6,760,732 B2 | 7/2004 | Busshart et al. |
| 6,763,395 B1 | 7/2004 | Austin |
| 6,766,312 B2 | 7/2004 | Landt |
| 6,768,987 B1 * | 7/2004 | Couch et al. .................... 707/3 |
| 6,769,095 B1 | 7/2004 | Brassard et al. |
| 6,778,537 B1 | 8/2004 | Ishibashi |
| 6,801,822 B1 | 10/2004 | Fujiwara et al. |
| 6,807,632 B1 | 10/2004 | Carpentier et al. |
| 6,809,732 B2 | 10/2004 | Zatz et al. |
| 6,832,120 B1 | 12/2004 | Frank et al. |
| 6,836,892 B2 | 12/2004 | Ikoma et al. |
| 6,839,790 B2 | 1/2005 | Barros De Almeida et al. |
| 6,842,769 B1 | 1/2005 | Kim et al. |
| 6,853,920 B2 | 2/2005 | Hsiung et al. |
| 6,865,509 B1 | 3/2005 | Hsiung, et al. |
| 6,868,413 B1 | 3/2005 | Grindrod et al. |
| 6,874,145 B1 | 3/2005 | Ye et al. |
| 6,874,146 B1 | 3/2005 | Iyengar |
| 6,880,060 B2 | 4/2005 | Talagala et al. |
| 6,889,282 B2 | 5/2005 | Schollenberger |
| 6,901,578 B1 | 5/2005 | Beaven et al. |
| 6,904,450 B1 * | 6/2005 | King et al. .................. 709/203 |
| 6,904,473 B1 | 6/2005 | Bloxham et al. |
| 6,920,474 B2 | 7/2005 | Walsh et al. |
| 6,928,521 B1 | 8/2005 | Burton et al. |
| 6,930,985 B1 | 8/2005 | Rathi et al. |
| 6,934,749 B1 | 8/2005 | Black et al. |
| 6,938,079 B1 | 8/2005 | Anderson et al. |
| 6,944,626 B2 | 9/2005 | Cameron et al. |
| 6,947,947 B2 | 9/2005 | Block et al. |
| 6,950,900 B1 | 9/2005 | McKean et al. |
| 6,954,770 B1 | 10/2005 | Carlson et al. |
| 6,961,728 B2 | 11/2005 | Wynblatt et al. |
| 6,973,556 B2 | 12/2005 | Milligan et al. |
| 6,975,913 B2 | 12/2005 | Kreidler et al. |
| 6,985,902 B2 * | 1/2006 | Wise et al. ..................... 707/10 |
| 7,000,017 B1 * | 2/2006 | McGill et al. ............... 709/226 |
| 7,065,714 B1 * | 6/2006 | Theel et al. .................. 715/781 |
| 7,146,355 B2 * | 12/2006 | Chu-Carroll ..................... 707/3 |
| 7,162,312 B2 * | 1/2007 | Gross et al. .................... 700/79 |
| 7,171,476 B2 | 1/2007 | Maeda et al. |
| 7,225,193 B2 | 5/2007 | Mets et al. |
| 7,251,222 B2 | 7/2007 | Chen et al. |
| 7,308,454 B2 | 12/2007 | Abineri et al. |
| 2002/0007286 A1 * | 1/2002 | Okamoto ........................ 705/2 |
| 2002/0012401 A1 | 1/2002 | Karolys et al. |
| 2002/0013748 A1 | 1/2002 | Edmison et al. |
| 2002/0069167 A1 | 6/2002 | Conlow |
| 2002/0073236 A1 | 6/2002 | Helgeson et al. |
| 2002/0087786 A1 | 7/2002 | Burton et al. |
| 2002/0091838 A1 | 7/2002 | Rupp et al. |
| 2002/0103785 A1 | 8/2002 | Harvey |
| 2002/0131404 A1 * | 9/2002 | Mehta et al. ................. 370/352 |
| 2002/0161827 A1 | 10/2002 | Brault |
| 2002/0188366 A1 * | 12/2002 | Pepper et al. ............... 700/108 |
| 2002/0194577 A1 | 12/2002 | Connor et al. |
| 2003/0014387 A1 | 1/2003 | Kreidler et al. |
| 2003/0036876 A1 | 2/2003 | Fuller et al. |

| | | |
|---|---|---|
| 2003/0065673 A1 | 4/2003 | Grobler et al. |
| 2003/0090514 A1 | 5/2003 | Cole et al. |
| 2003/0120710 A1 | 6/2003 | Pulsipher et al. |
| 2003/0123467 A1 | 7/2003 | Du et al. |
| 2003/0126308 A1 | 7/2003 | Kim |
| 2003/0172145 A1* | 9/2003 | Nguyen ................... 709/223 |
| 2003/0177114 A1 | 9/2003 | Lin et al. |
| 2003/0184584 A1* | 10/2003 | Vachuska et al. ............ 345/762 |
| 2003/0212828 A1 | 11/2003 | Miyazaki et al. |
| 2003/0218641 A1 | 11/2003 | Longobardi |
| 2004/0006401 A1 | 1/2004 | Yamada et al. |
| 2004/0024995 A1 | 2/2004 | Swaine |
| 2004/0044421 A1 | 3/2004 | Brune et al. |
| 2004/0073565 A1 | 4/2004 | Kaufman et al. |
| 2004/0098153 A1 | 5/2004 | Neudeck |
| 2004/0098269 A1 | 5/2004 | Wise et al. |
| 2004/0117624 A1 | 6/2004 | Brandt et al. |
| 2004/0153171 A1* | 8/2004 | Brandt et al. ................... 700/9 |
| 2004/0167790 A1 | 8/2004 | Grasse |
| 2004/0193449 A1 | 9/2004 | Wildman et al. |
| 2004/0196855 A1 | 10/2004 | Davies et al. |
| 2004/0199655 A1 | 10/2004 | Davies et al. |
| 2004/0203620 A1 | 10/2004 | Thome et al. |
| 2004/0210629 A1 | 10/2004 | Klindt et al. |
| 2004/0249771 A1 | 12/2004 | Berg et al. |
| 2004/0260591 A1 | 12/2004 | King |
| 2004/0268186 A1 | 12/2004 | Maturana et al. |
| 2005/0005289 A1 | 1/2005 | Adolph et al. |
| 2005/0015397 A1 | 1/2005 | Abineri et al. |
| 2005/0043922 A1* | 2/2005 | Weidl et al. ................. 702/183 |
| 2005/0044112 A1 | 2/2005 | Yamamoto et al. |
| 2005/0065626 A1 | 3/2005 | Kappelhoff et al. |
| 2005/0065829 A1 | 3/2005 | Birkhoelzer |
| 2005/0065971 A1 | 3/2005 | Honda |
| 2005/0069853 A1 | 3/2005 | Tyson et al. |
| 2005/0091349 A1 | 4/2005 | Scheibli |
| 2005/0102672 A1 | 5/2005 | Brothers |
| 2005/0107897 A1 | 5/2005 | Callaghan |
| 2005/0108247 A1 | 5/2005 | Heinla et al. |
| 2005/0120021 A1 | 6/2005 | Tang et al. |
| 2005/0129247 A1 | 6/2005 | Gammel et al. |
| 2005/0135782 A1 | 6/2005 | Ando et al. |
| 2005/0154741 A1 | 7/2005 | Hebert et al. |
| 2005/0166215 A1 | 7/2005 | Holloway et al. |
| 2005/0177687 A1 | 8/2005 | Rao |
| 2005/0187925 A1 | 8/2005 | Schechinger et al. |
| 2005/0193118 A1 | 9/2005 | Le et al. |
| 2005/0198248 A1 | 9/2005 | Morimoto et al. |
| 2005/0216460 A1 | 9/2005 | Yoon et al. |
| 2005/0223010 A1 | 10/2005 | Murray |
| 2005/0251527 A1 | 11/2005 | Phillips et al. |
| 2005/0256788 A1 | 11/2005 | Mukai |
| 2005/0268253 A1 | 12/2005 | Johnson et al. |
| 2005/0278373 A1 | 12/2005 | Corbett et al. |
| 2006/0004475 A1 | 1/2006 | Brackett et al. |
| 2006/0004847 A1 | 1/2006 | Claudatos et al. |
| 2006/0064428 A1 | 3/2006 | Colaco et al. |
| 2006/0173895 A1* | 8/2006 | Engquist et al. ............. 707/102 |
| 2006/0195817 A1* | 8/2006 | Moon ......................... 717/104 |
| 2006/0212855 A1 | 9/2006 | Bournas et al. |
| 2007/0268922 A1 | 11/2007 | Dougan et al. |

OTHER PUBLICATIONS

Pitzek et al., Configuration and Management of a Real-Time Smart Transducer Network, 2003 IEEE, 2003, 4 pages.
European Search Report dated Jun. 12, 2005 for European Patent Application Serial No. EP05016793, 3 pages.
John Kubiatowicz, et al. "OceanStore: An Architecture for Global-Scale Presistent Storage" ASPLOS 2000, Cambridge, Massachusetts (2000).
Roy Goldman, et al. "From Semistructured Data to XML: Migrating the Lore Data Model and Query Language" (1999).
International Search Report and Written Opinion for PCT Application No. PCT/US06/18181 dated Mar. 4, 2008.
OA dated Oct. 28, 2008 for U.S. Appl. No. 11/240,335, 15 pages.
ISR mailed Jun. 19, 2008 for PCT Application No. PCT/ US06/ 18350, 2 pages.
OA dated Apr. 15, 2009 for U.S. Appl. No. 11/240,335, 10 pages.
OA dated May 15, 2008 for U.S. Appl. No. 11/240,335, 31 pages.
OA dated Oct. 8, 2008 for U.S. Appl. No. 11/238,607, 32 pages.
ISR mailed Jul. 7, 2008 for PCT Application No. PCT/ US06/ 18180, 2 pages.
OA dated Mar. 6, 2009 for U.S. Appl. No. 11/238,607, 61 pages.
OA dated Apr. 2, 2008 for U.S. Appl. No. 11/238,607, 37 pages.
OA dated Jun. 3, 2009 for U.S. Appl. No. 11/238,606, 25 pages.
OA dated Jul. 2, 2008 for U.S. Appl. No. 11/238,606, 17 pages.
OA dated Jan. 18, 2008 for U.S. Appl. No. 11/238,606, 8 pages.
OA dated Nov. 20, 2008 for U.S. Appl. No. 11/238,606, 19 pages.
OA dated Apr. 22, 2008 for U.S. Appl. No. 11/238,537, 48 pages.
OA dated Apr. 15, 2009 for U.S. Appl. No. 11/238,537, 22 pages.
Ozsoyoglu, et al. Database Systems for Programmable Logic Controllers. Last accessed Apr. 15, 2009, 17 pages.
OA dated Oct. 20, 2008 for U.S. Appl. No. 11/238,537, 44 pages.
ISR mailed May 6, 2008 for PCT Application No. PCT/ US06/ 18122, 1 page.
ISR mailed Jan. 24, 2008 for PCT Application No. PCT/ US06/ 18238, 1 page.
Office Action dated Nov. 16, 2009 for U.S. Appl. No. 11/238,607, 84 pages.

\* cited by examiner

LIBRARY THAT INCLUDES MODIFIABLE INDUSTRIAL AUTOMATION OBJECTS

CROSS-REFERENCE TO RELATED APPLICATION

This application claims the benefit of U.S. Provisional Patent Application Ser. No. 60/680,682, filed on May 13, 2005 and entitled SCHEMA THAT FACILITATES PLANT REPRESENTATION AND RELATED FUNCTIONALITY, the entirety of which is incorporated herein by reference.

TECHNICAL FIELD

The claimed subject matter relates to industrial control systems and, more particularly, to obtaining objects that can be utilized in connection with a programmable logic controller.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers has been largely unchanged. Industrial controllers are special-purpose computers utilized for controlling industrial processes, manufacturing equipment, and other factory automation processes, such as data collection through networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Often such as in the case of automobiles, complex assemblies can be manufactured with high technology robotics assisting the industrial control process.

In many automated processes, including the basic production of commodities such as food, beverages, and pharmaceuticals, complex state logic is often designed and programmed by systems Engineers or provided in some cases by automated equipment manufacturers. This logic is often programmed with common PLC ladder logic or higher level languages supported by Sequential Function Charts or Function Blocks. Sequence logic can be employed for a plurality of tasks such as material movement and conveying operations, packaging operations, or as part of an assembly process itself, wherein various stages of an assembly are sequenced from stage to stage until a final assembly occurs. As can be appreciated, much planning and design is required to implement an automated production process that can involve hundreds of machines, computers, and program logic to facilitate proper operation of the respective sequences.

A common problem associated with control systems is lack of uniformity across system/process boundaries, as well as a lack of uniformity between controller manufacturers, software vendors, and customers. Such non-uniformity can be as simplistic as discrepancies in naming conventions between a software vendor and a customer, or as complex as disparate software representations with respect to portions of an industrial automation framework. Given the above-mentioned discrepancies (as well as a myriad of other discrepancies), a substantial amount of ad-hoc coding is often required to automate a process. Accordingly, a substantial amount of cost is incurred by a manufacturer to employ computer and programming specialists to generate and maintain ad-hoc programs necessary to automate a manufacturing process. This cost is then passed on to purchasers of the manufactured product.

With more detail regarding conventional controllers, such controllers have been designed to efficiently undertake real-time control. For instance, conventional programmable logic controllers receive data from sensors and, based upon the received data, control an actuator, drive, or the like. These controllers recognize a source and/or destination of the data by way of a symbol and/or address associated with a source and/or destination. More particularly, industrial controllers include communications ports and/or adaptors, and sensors, actuators, drives, and the like are communicatively coupled to such ports/adaptors. Thus, a controller can recognize device identify when data is received and further deliver control data to an appropriate device.

As can be discerned from the above, data associated with conventional industrial controllers is created, delivered, and/or stored with a flat namespace data structure. In other words, all that can be discovered by reviewing data received and/or output by a controller is an identity of an actuator or sensor and a status thereof. This industrial controller architecture operates efficiently for real-time control of a particular device—however, problems can arise when data from industrial controllers is desired for use by a higher-level system. For example, if data from the controller was desired for use by a scheduling application, individual(s) familiar with the controller must determine which data is desirable, sort the data, package the data in a desired format, and thereafter map such data to the scheduling application. This introduces another layer of software, and thus provides opportunities for confusion in an industrial automation environment. The problem is compounded if several applications wish to utilize similar data. In operation, various controllers output data, package it in a flat namespace structure, and provide it to a network. Each application utilizing the data copies such data to internal memory, sorts the data, organizes the data, and packages the data in a desired format. Accordingly, multiple copies of similar data exist in a plurality of locations, where each copy of the data may be organized and packaged disparately.

It can be determined from the above that providing control logic to conventional programmable logic controllers is a difficult task, as such logic often must be created by way of a proprietary language. Thus, vendors associated with a controller may need to visit a manufacturing site and thereafter generate custom programming for a particular application. This causes unnecessary delay and inefficiencies with respect to an industrial automation environment.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

An online library of objects is described herein, wherein such library provides operators/factories with an ability to quickly update control applications given addition of devices/processes to an industrial environment. The library includes objects that are executable by programmable logic controllers and designed in accordance with a hierarchically structured data model. In one particular example, the hierarchically structured data model can be based at least in part on ISA S95 and/or ISA S88 and/or OMAC. Through utilization of a hierarchically structured data model, programming can be accomplished in a "top-down" manner, which is in contrast to the "bottom-up" manner utilized to program conventional programmable logic controllers. For instance, conventionally, tags are first defined and named and associated with sensors/actuators. Due to the flat nature of conventional programming logic, it is important that each controller and each tag be provided with a unique name—otherwise, duplication in data and confusion can result. Use of a hierarchically structured data model ensures uniqueness of names/data, as the hierarchical structure essentially guarantees such uniqueness.

In accordance with one particular feature, objects can be sold from the library to one or more entities desiring use of one or more objects. In one example, a new device can be placed within an industrial system, but an object that facilitates control of the device (by a programmable logic controller) may not be packaged with the device. An operator can access the library of objects and locate a desired object based upon the device type. The operator can then purchase the object through a credit card payment or other suitable online payment, and the object can be delivered to the operator by way of the Internet. Upon receipt of the object, the operator can modify parameters associated therewith, such as timing parameters (e.g., an amount of time that passes between operation of a pump). In another example, a distribution component can be utilized to automatically provide a plurality of users with an object. For example, a plurality of entities can subscribe to the object library, and the distribution component can automatically provide a subset of the subscribers with an object that has been recently added to the object library. Thus, subscribers can immediately receive new control objects upon creation thereof.

In another example, a pinging component can be utilized to provide entities with information regarding a control object recently added to the object library. For example, the object library can be associated with a subscription service and have access to data regarding subscribers to the object library. For instance, a first entity may primarily manufacture a first product using a first set of devices, and a second entity may primarily manufacture a second product and use a second set of devices. The pinging component can selectively make the entities aware of additional objects within the library based at least in part upon such parameters. The pinging component, for example, can send a subscriber an email that includes information relating to an object that has been recently added to the library of objects. In another example, the pinging component can cause transmission of a facsimile to a subscriber. It can thus be discerned that any suitable communication medium is contemplated and intended to fall under the scope of the hereto-appended claims.

In another example, a location component associated with a data storage unit can be utilized in connection with monitoring versions of an object. In other words, the location component can monitor objects associated with a particular enterprise/factory and verify a version of objects running at such plant. This object verification can be undertaken at any suitable time. Furthermore, objects can be sub-classed from existing objects in an online object library. This enables creation of derivative objects that can match a specific instance of a plant automation scenario.

In yet another example, a search function can be provided that enables entities desiring access to a library of objects to search the library. For instance, the search parameters can relate to a type of device that is desirably controlled together with parameters specifying the unique device. The library could then suggest one or more components based at least in part upon the parameters provided for the search.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
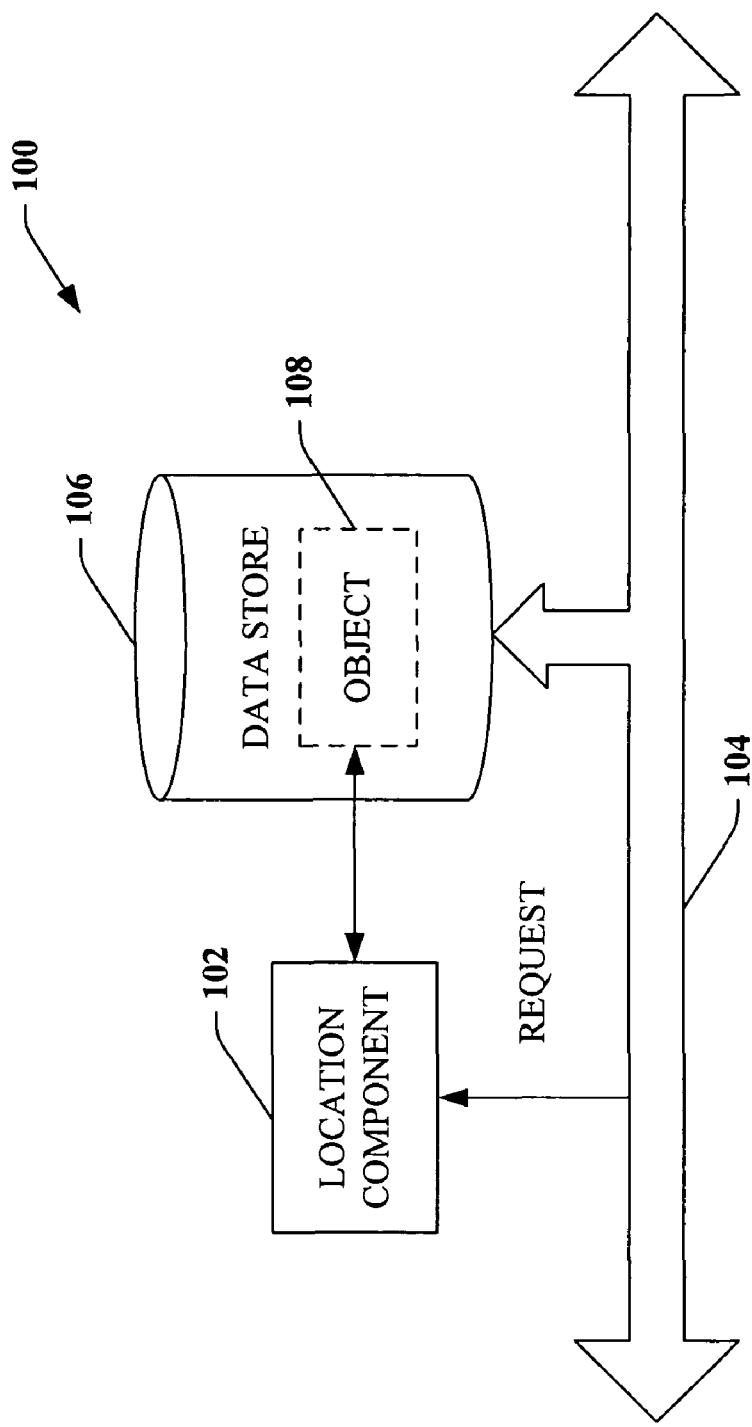
FIG. 1 is a high-level system block diagram of an online object library, wherein the object library includes objects that can be employed to control a system/process.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates an object library system 100 that can be utilized to provide objects to a requesting entity. The system 100 includes a location component 102 that receives an object retrieval request over the Internet 104 (or an intranet). It is understood that any suitable Internet technologies can be utilized in connection with request and delivery of objects. Thus, for example, the request can be received by way of a web browser that is directed to a web site that facilitates receipt of requests for objects. The location component 102 can then access a data store 106 that retains an object 108 that is the subject of the request. After the object 108 is located by the location component 102, the object 108 can be delivered to a requesting entity (not shown) by way of the Internet 104. For instance, the request can include parameters relating to a device, system, process, or sub-process desirably controlled, together with various parameters associated with control, and an object from within the data store 106 can be located based upon the request. In other words, the location component 102 can include search engine functionalities.

In accordance with one feature, the object 108 can conform to a hierarchically structured data model (rather than a flat data model) and be executable by a programmable logic controller (not shown). In more detail, the programmable logic controller can include a least a portion of a schema that enables such controller to recognize and output data that is structured in accordance with the hierarchically structured data model. The programmable logic controller, through utilization of this data model, can interact with other controllers as well as higher-level systems, such as an Enterprise Resource Planning (ERP) system. ERP systems typically handle manufacturing, logistics, distribution, inventory, shipping, invoicing, and accounting for a company. The schema referenced above can also be employed by an ERP system associated with the programmable logic controller, thereby enabling seamless communication between programmable logic controllers and ERP systems. Conventional systems, in contrast, often require ad-hoc programming to map between low-level logic utilized in controllers with more advanced object-oriented programming languages often employed within ERP systems. Another common use would be to interact with a Supply Chain Management system (SCM).

The hierarchically structured data model can be designed in such a manner to enable the object 108 to correspond to a hierarchical arrangement of devices and/or a hierarchical arrangement of processes that occur within the plant. Furthermore, the hierarchically structured data model can be designed in a manner that enables modeling of a plant across system and/or process boundaries. For instance, today's manufacturing facilities include batch processing, continuous processing, discrete processing, as well as inventory processing. Communication of meaningful data between these systems and processes is extremely difficult, as they are often designed and operated without regard for an adjacent process. The hierarchically structured data model can be implemented so that a substantially similar structure is provided with respect to a batch process, a continuous process, a discrete process, and inventory tracking. In one particular example, the hierarchically structured data model can be modeled in accordance with ISA S95, ISA S88, and/or a combination thereof.

An example is provided herein to illustrate one or more applications of the system 100. A programmable logic controller that can execute objects that are designed in accordance with the hierarchically structured data model can be associated with a device that has been recently produced and/or not utilized within an enterprise associated with the programmable logic controller. Thus, the programmable logic controller will not include control logic associated with such device. Conventionally, a vendor of the device and/or the programmable logic controller would go on site to configure the controller so that it can control the device. Using the system 100 and a hierarchically structured data model, however, one need only to access the data store 106 to retrieve an object that is associated with the device. For example, if the device is a pump, an object that corresponds to such pump can be created and placed within the data store 106. A requesting entity can then retrieve the object by way of the Internet 104, and then quickly modify such object as desired. For instance, the object can include parameters relating to speed of the pump, timing relating to the pump, and the like. The object retrieved from the data store 106 can be a shell with a structure relating to the pump, and the operator can quickly and easily populate the shell so that a customized object is implemented by the programmable logic controller. Moreover, metadata associated with objects can be provided therewith. This metadata can describe intended use of the object, identity a device that is associated with the object, etc, thereby aiding in discovery and operability of the device.

With more detail regarding the object 108, availability of such object 108 can be constrained as a function of time. For instance, the object 108 may only be available until a specified date and time. In another example, the availability of the object 108 and the presentation of such object 108 can be configured with respect to a context of a requesting entity, including entity role (whether the entity is an operator, a technician, associated with diagnostics, etc.). Furthermore, the data store 106 can be distributed, and contents therein can be collaborated to present a unified library of objects. Moreover, access to the data store 106 by clients can be managed based at least in part upon subscriptions and other time-based access criteria.

Figure 2:
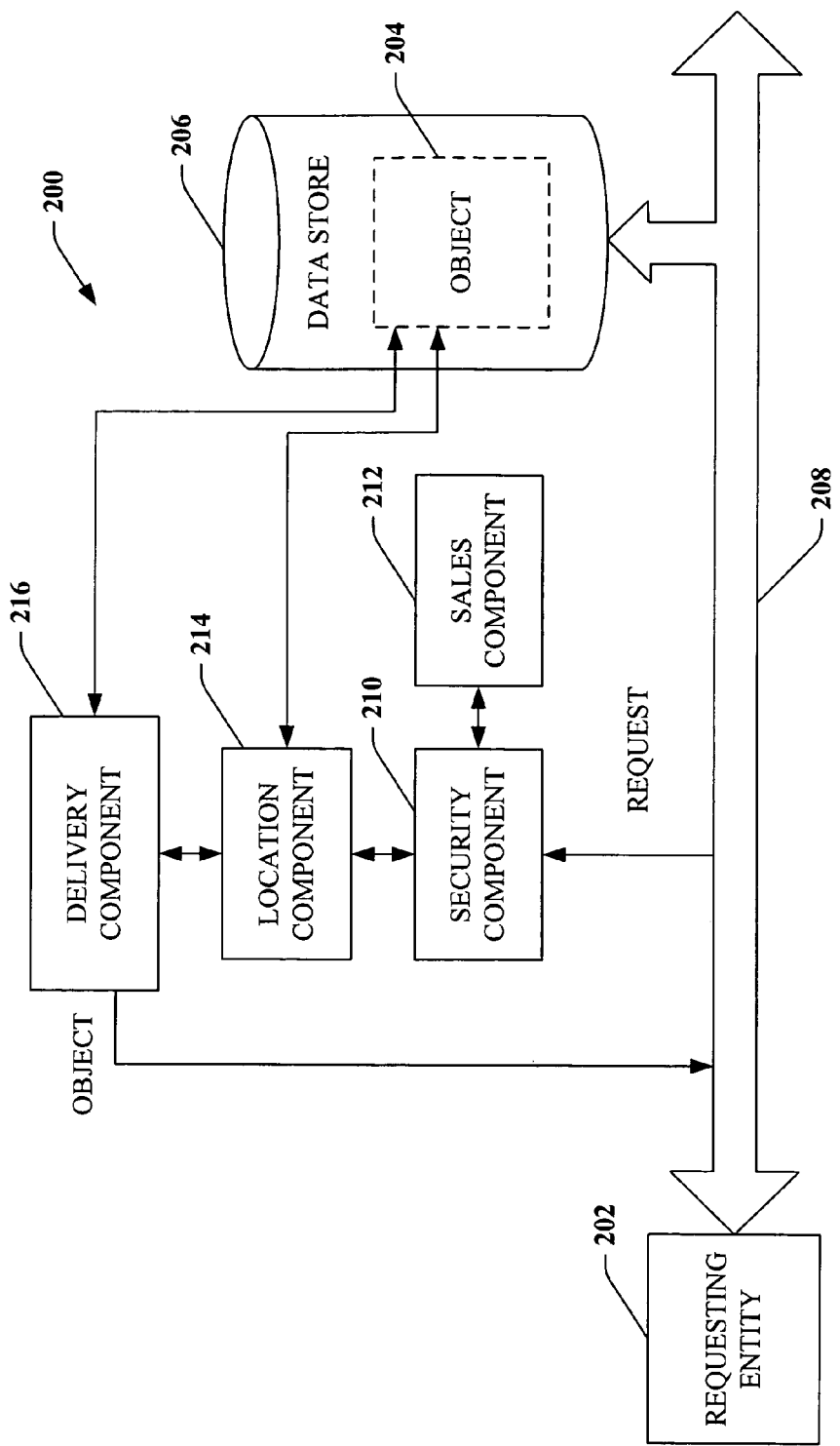
FIG. 2 illustrates a system that facilitates sale of objects to requesting entities, wherein the objects can be utilized to control a system/process.

Referring now to FIG. 2, an object library system 200 that facilitates provision of objects that are executable by a programmable logic controller to a requesting entity 202 is illustrated. The requesting entity 202 can make a request for an object 204 that is housed in a data store 206 by way of the Internet 208. For instance, the requesting entity 202 can utilize a web browser to access the data store 206, open a file transfer protocol (FTP) connection to access the data store 206, or utilize any other suitable means to access the data store 206 over the Internet in connection with retrieving the object 204. Furthermore, as described above, the object 204 can be executed by a programmable logic controller and designed in accordance with a hierarchically structured data model. A request for the object 204 is received by a security component 210 that ensures that the requesting entity 202 is authorized to access the data store 206. For example, it would not be desirable to grant access to the data store 206 to a company that is not a client of the creator of the object 204. In another example, it would not be desirable to grant access to the data store 206 to a competitor of an owner of such data store 206. The security component 210 can request identifying data from the requesting entity 202, such as username, password, personal identification number, account number, digitized biometric indicia, or any other suitable data. The security component 210 can then analyze the provided data and determine whether the requesting entity 202 is authorized to access the data store 206. For instance, the security component 210 can review a table that includes identities of entities and authorization levels associated therewith. In still another example, the security component 210 can ensure that the data store 206 is associated with sufficient physical resources to enable addition of objects to such data store 206. For instance, the security component 210 can determine that the data store 206 is not associated with a power source, and inform an operator of such lack of power. In another example, the security component 210 can determine that the data store 206 is associated with insufficient capacity for an object that is desirably submitted to such data store 206. Still further, the security component 210 can consider an entity/user's context, such as entity/user's role (operator, technician, electrician, . . . ), an entity/user's scenario (routine maintenance, plant diagnostics, . . . ), and such context can be input to the security component 210 and employed to manage access to the data store 206. Further, the security component 210 can account for configuration of the data store 206 as well as connected devices.

The security component 210 can be associated with a sales component 212 that facilitates sale of the object 204 to the requesting entity 202. For instance, the sales component 212 can include hardware/software that facilitates providing payment options to the requesting entity 202 as well as processing of payment from such entity 202. For instance, the sales component 212 can process credit card payments, payments from checking/savings account, or any other form of electronic payment. Furthermore, the sales component 212 can save such information for further purchases. In another example, the sales component 212 can generate and deliver a bill to the requesting entity 202, and the requesting entity 202 can then issue payment by mail if desired.

Upon receipt of payment and/or generation of billing by the sales component 212, a location component 214 can locate the object 204, and a delivery component 216 can deliver the object 204 to the requesting entity 202 over the Internet 208. For example, the delivery component 216 can provide the requesting entity 202 with an option to download the object 204 to a hard disk associated with the requesting entity 202. In another example, the deliver component 216 can deliver the object 204 to the requesting entity 202 by way of email (as an attachment). It is thus understood that the delivery component 216 can facilitate delivery of the object 204 to the requesting entity 202 over the Internet 208 through any suitable means.

Figure 3:
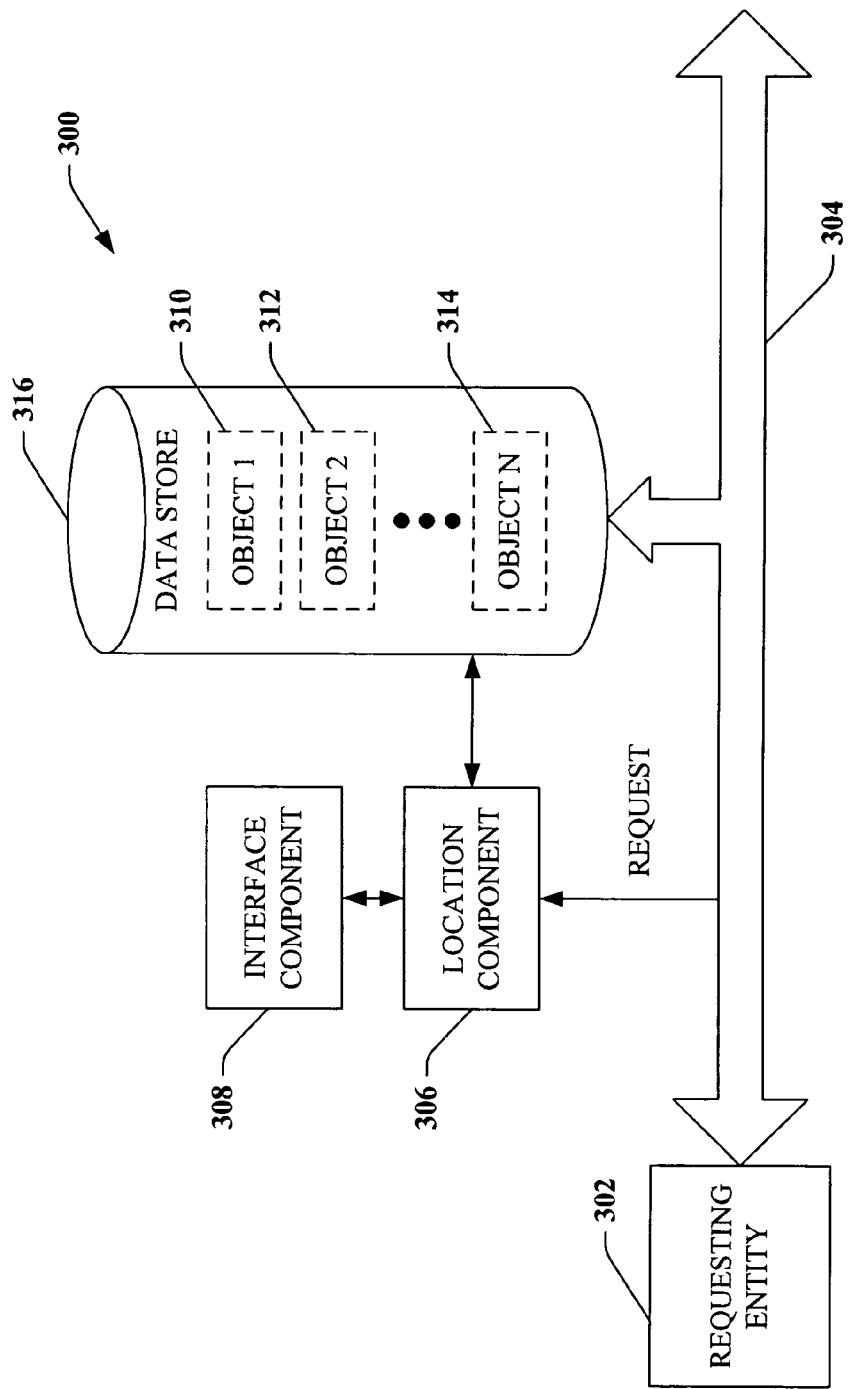
FIG. 3 illustrates a system that facilitates display of a subset of objects within an object library based at least in part upon identity of an entity requesting a viewing of objects within the object library.

Now turning to FIG. 3, a system 300 that facilitates provision of an object for utilization in an industrial automation environment is illustrated. The object can be created in accordance with a hierarchically structured data model and designed for use by a programmable logic controller. A requesting entity 302 can submit a request for an object over the Internet 304. For example, the requesting entity 302 can utilize a web browser to access a secure website (through which a desired object can be obtained). The request can be received by a location component 306 that is utilized to locate a desired object. The location component 306 can be associated with an interface component 308 that provides a particular interface to the requesting entity 302. For example, the interface component 308 can analyze identity of the requesting entity 302 and provide the entity 302 with a customized user interface. In more detail, it may not be desirable to provide the requesting entity 302 with a view of each of a plurality of objects 310-314 available within a data store 316. For instance, the interface component 308 can provide an interface that is associated with the requesting entity 302—thus, the requesting entity 302 will be provided with a subset of the objects 310-314. In a more specific example, the requesting entity 302 may not be associated with a device represented by the object 312, and the interface component 308 can filter such object 312 so that the requesting entity 302 is not overwhelmed with superfluous information. The interface component 308 therefore enhances usability of the system 300. The requesting entity 302 can request one of the plurality of objects 310-314 from within the data store 316 that are provided by the interface component 308. The location component 306 can then locate the requested object within the data store 316 and the requested/located object can be delivered to the requesting entity 302 by way of the Internet 304.

Furthermore, when one or more of the plurality of objects 310-314 are provided to the requesting entity 302, an audit trail can be generated, thereby allowing management interfaces (not shown) to report on where and when versions of the objects 310-314 have been delivered. Furthermore, it is understood that the data store 316 can be distributed—however, such distribution can be transacted thereby allowing presentation of sets of library contents from multiple sources to be aggregated and supplied as a single set. Furthermore, the objects 310-314 can include replaceable arguments that generate requests for the requesting entity 302 to provide information relevant to an environment in which a requested object is being instantiated. In still another example, access to the data store can be managed by work flows, wherein such work flows are utilized to manage deployment of the objects 310-314 and invoking supporting components such as wizards, security requests, validation scripts, and resource bindings (material, equipment, personnel, etc.).

Figure 4:
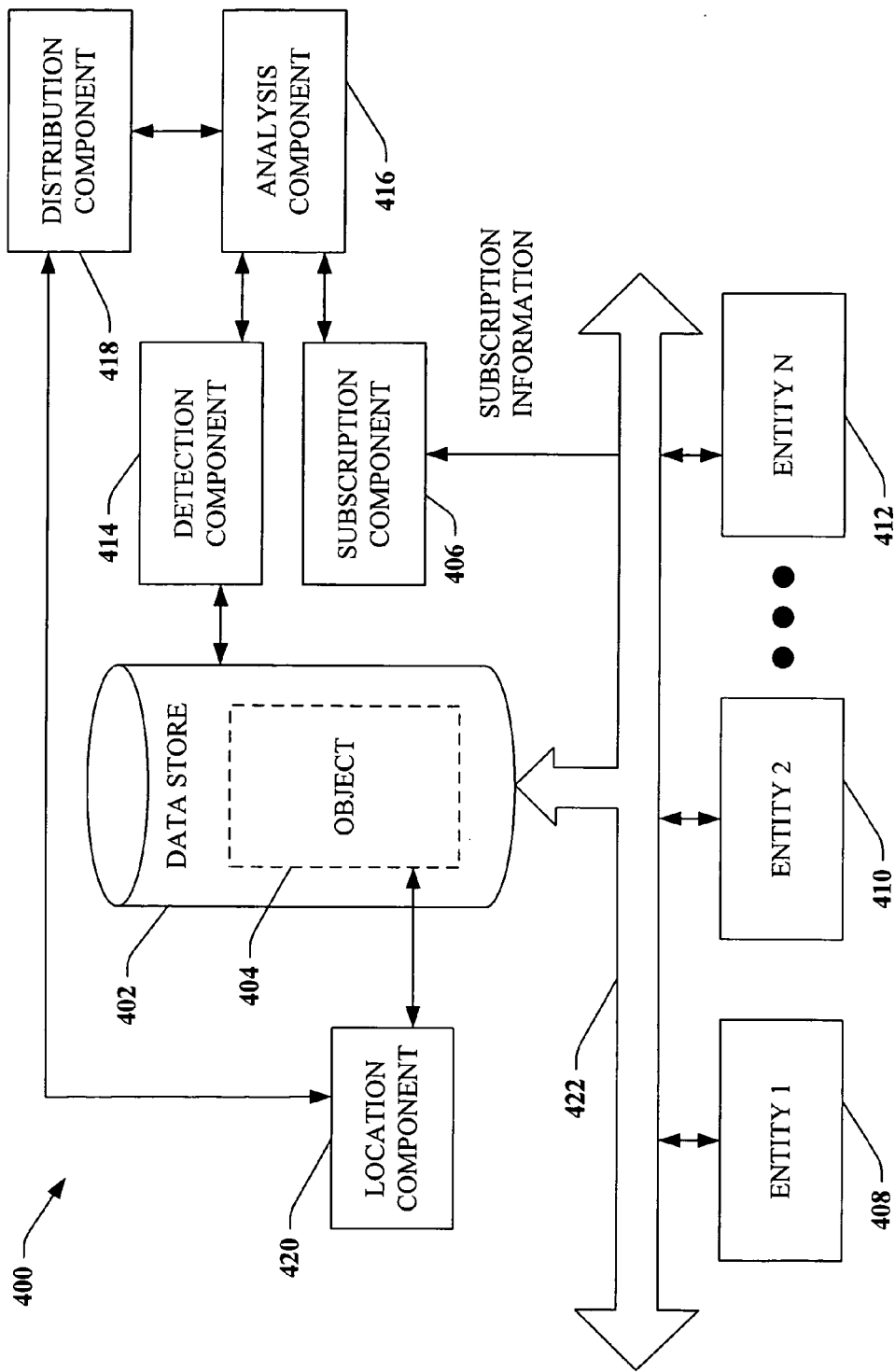
FIG. 4 illustrates a system that facilitates automatic distribution of an object to a plurality of subscribers of an object library.

Referring now to FIG. 4, a library system 400 that enables retrieval of an object for utilization in a programmable logic controller is illustrated. The system 400 includes a data store 402 that retains an object 404, wherein the object 404 can be implemented by a programmable logic controller (not shown). Furthermore, as described above, the object 404 is designed in accordance with a hierarchically structured data model, which can be based at least in part upon ISA S95, ISA S88, and/or a combination thereof. Thus, the hierarchically structured data model can be based upon a physical hierarchy (e.g., enterprise, plant, cell, line, device, . . . ) or a more abstract hierarchy, such as a process-based hierarchy.

The system 400 can further include a subscription component 406 that enables a plurality of entities 408-412 to subscribe to the data store 402. For example, the entities 408-412 can register with the subscription component 406, much like an individual registering for a listserv. The subscription component 406 can retain information such as IP address associated with the entities 408-412, email addresses associated with the entities 408-412, preferences of the entities 408-412, devices utilized by the entities 408-412, and any other suitable information. The system 400 can further include a detection component 414 that detects instances when an object is added to the data store 402. For example, the detection component 414 can detect that the object 404 has been recently added to the data store 402. The detection component 414 can relay an indication that the object 404 has been added to the data store 402 to an analysis component 416, which can in turn analyze subscription information associated with the subscription component 406. For instance, the object 404 can relate to a press, and the detection component 414 can inform the analysis component 416 of the addition of the object 404 to the data store 402 and parameters associated with the object. In another example, the detection component 414 can detect creation of a new version of an existing object, and inform the analysis component 416 of the new version (together with parameters associated with the version). The analysis component 416 can review subscription information associated with the subscription component 406 and determine which of the entities 408 would like to receive the object 404 (or the updated version thereof). A distribution component 418 can then facilitate automatic distribution of the object 404 or updated version thereof to appropriate subscribing entities. More particularly, the distribution component 418 can provide a location component 420 with an identity of one or more objects from within the data store 402 that are to be distributed to a subset of the entities 408-412. The location component 420 can locate the objects, and thereafter such objects can be distributed to the entities by way of the Internet 422.

Figure 5:
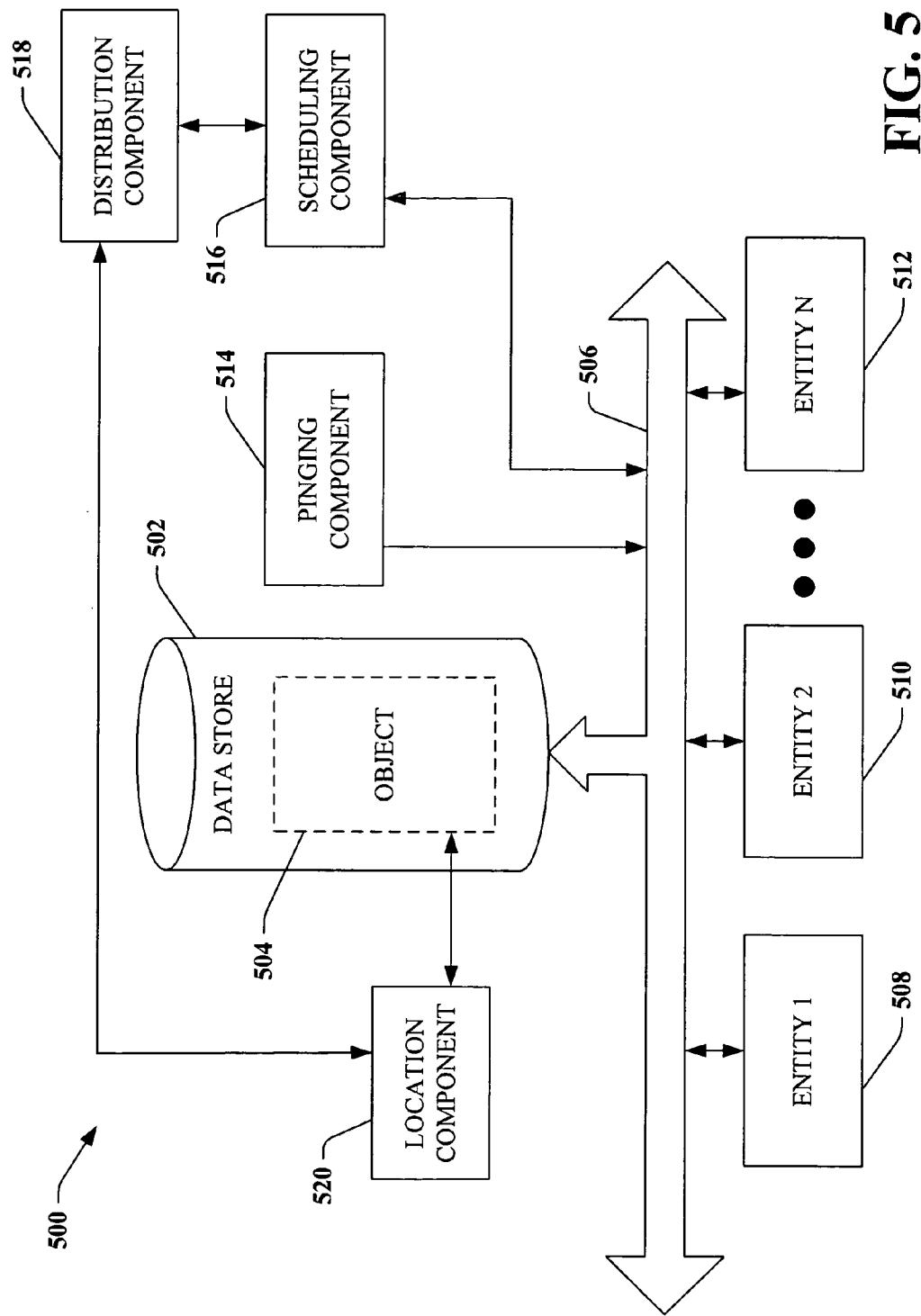
FIG. 5 illustrates a system that facilitates informing an entity when objects are added to an object library.

Referring now to FIG. 5, a system 500 that facilitates delivery of control objects over the Internet is illustrated. The objects can be executed by programmable logic controllers and are designed in accordance with a hierarchically structured data model. The system 500 includes a data store 502 that includes at least one object 504, where the object 504 is accessible by way of the Internet 506. For instance, a plurality of entities 508-512 can access the data store 502 via the Internet to retrieve the object 504 (or other objects retained within the data store 502). The system 500 can include a pinging component 514 that monitors the data store 502 for addition of objects to such data store 502. For instance, if the object 504 is added to the data store 502, the pinging component 514 can recognize such addition and ping a subset of the entities 508-512 regarding the object 504. For example, the pinging component 514 can determine which of the entities 508-512 may have interest in the object 504 and then inform such entities 508-512 of the availability of the object 504 (e.g., by way of email, text message, . . . ).

The system 500 can further include a scheduling component 516 that can determine times that the entities 508-512 are operating at off-peak hours. For example, bandwidth may be crucial to the entities 508-512 during peak operating hours, and such entities may not wish to receive objects during these hours. Accordingly, the entities 508-512 can register with the scheduling component 516 and inform such component 516 of times that peak hours occur. In another example, the scheduling component 516 can monitor the entities 508-512 and make a probabilistic determination relating to optimal delivery times of the object 504. A distribution component 518 can then be employed to facilitate distribution of the object 504 to a subset of the entities 508-512 during off-peak hours. For instance, the distribution component 518 can deliver an identity of the object 504 to a location component 520, which can in turn locate the object 504 from within the data store 502. The object 504 can then be delivered to a subset of the entities 508-512 by way of the Internet 506.

Figure 6:
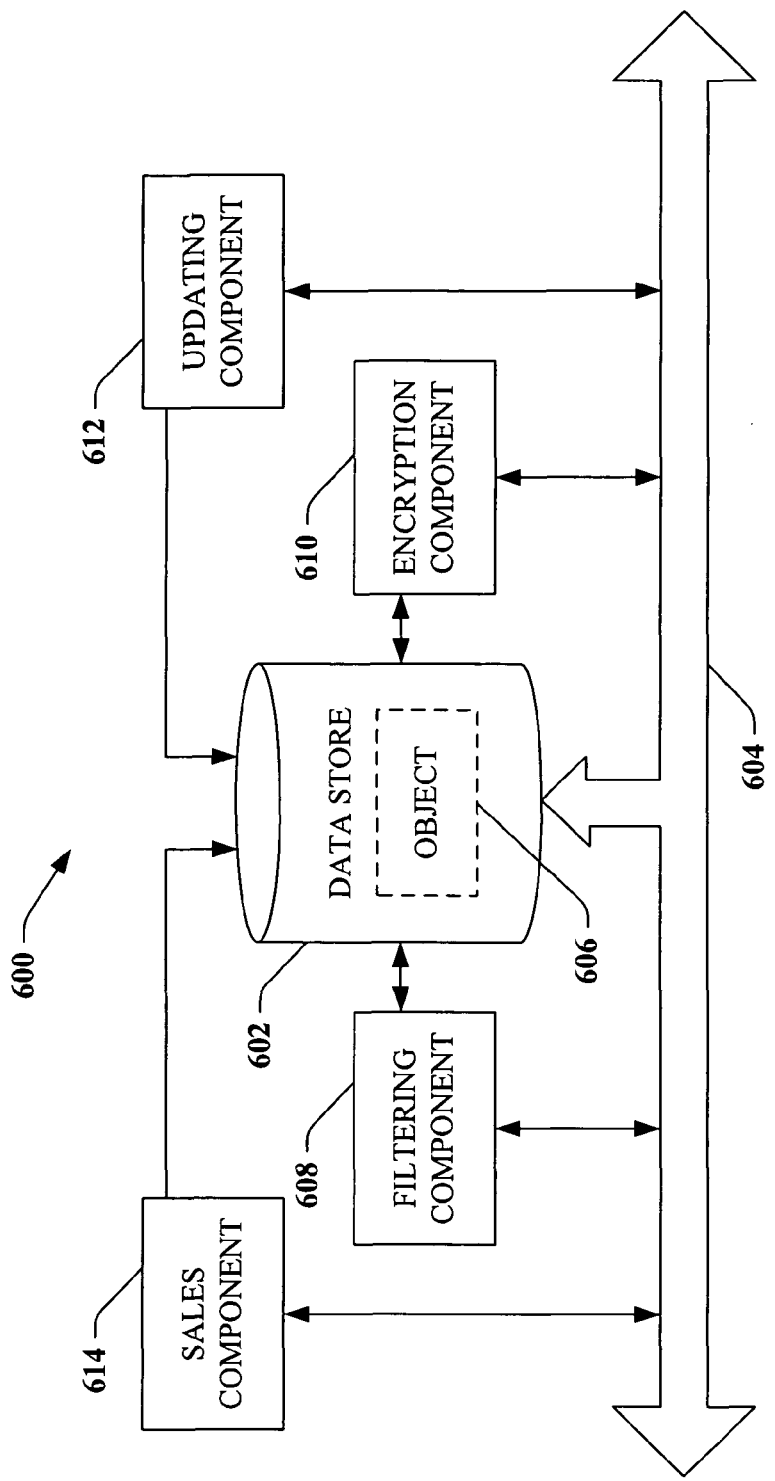
FIG. 6 illustrates a system that facilitates updating of an object library.

Turning now to FIG. 6, a system 600 that enables retrieval of control objects for use by a programmable logic controller by way of the Internet is illustrated. The objects, for example, can be structured in accordance with a hierarchical data model. The system 600 includes a data store 602 that is accessible to entities (not shown) by way of the Internet 604. The data store 602 includes an object 606 that can be downloaded and utilized by programmable logic controllers to control at least a part of a system and/or process. The system 600 further includes a filtering component 608 that can filter at least a portion of the object. For instance, the object 606 may be of substantial size, and may include nested objects that are not required for particular applications. To alleviate duplication, the filtering component can remove superfluous data prior to deliverance of the object 606 to a requesting entity. The system 600 can further include an encryption component 610 that can encrypt at least a portion of the object 606 prior to deliverance of the object 606 over the Internet 604. The encryption component 610 can employ any suitable encryption scheme to encrypt the object 606.

The system 600 can further include an updating component 612 that enables authorized entities to add objects to the data store 602. For example, an owner of a website that facilitates access to the data store 602 can create new objects and place such objects within the data store 602. Unauthorized entities, however, will not be able to add content to the data store 602. The system 600 can also include a sales component 614 that facilitates sale of the object 606 to entities that request such object. For example, the sales component 614 can sell a defined number of accesses to the data store 602 to a requesting entity. In another example, the sales component 614 can sell an entity access to the data store 602 for a set amount of time. Thus, the entity can access objects within the data store 602 for such period of time without additional pay. It can thus be understood that any suitable manner for selling objects from the data store 602 is contemplated and intended to fall under the scope of the hereto-appended claims.

Figure 7:
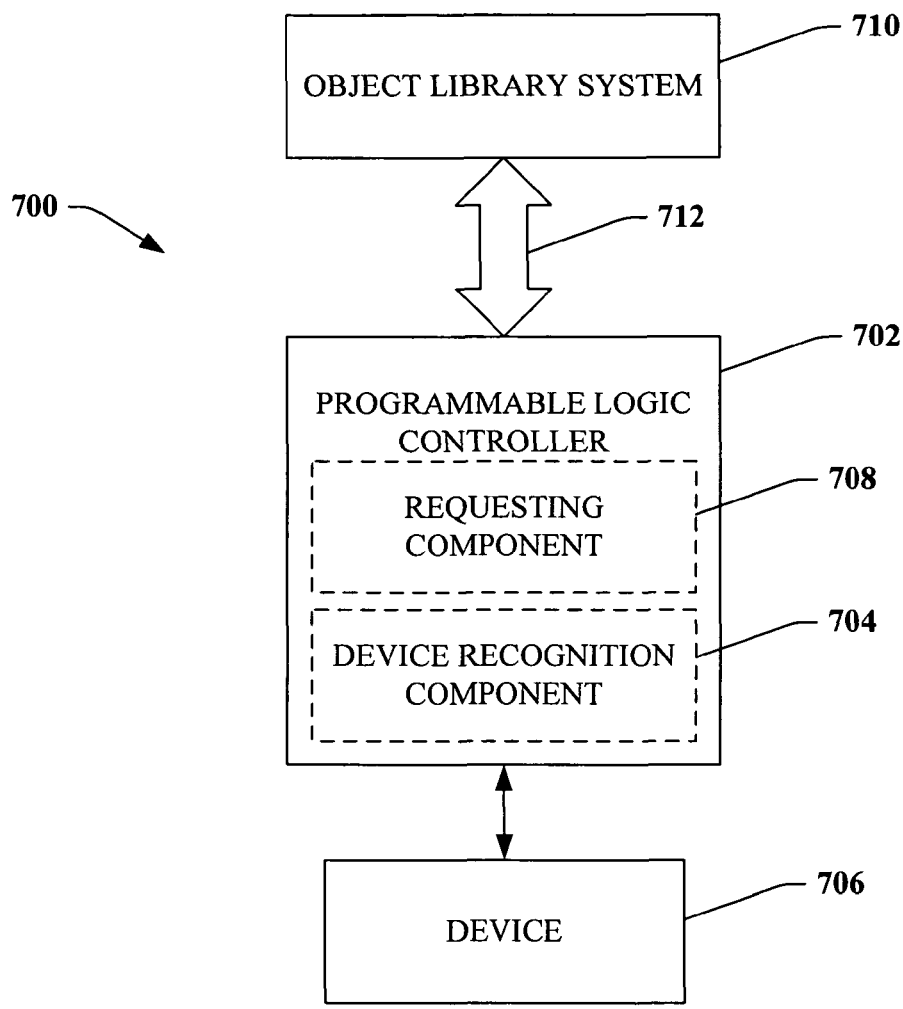
FIG. 7 illustrates a system that facilitates automatic requesting of an object from within an object library, the request generated by a programmable logic controller.

Now referring to FIG. 7, a system 700 that facilitates retrieval of a control object from an online source is illustrated. The system 700 includes a programmable logic controller 702 that can execute objects that conform to a hierarchically structured data model (e.g., modeled after ISA S95, ISA S88, and/or a combination thereof). The programmable logic controller 702 includes a device recognition component 704 that recognizes when a device 706 is communicatively coupled to the programmable logic controller 702. In other words, if the device 706 is coupled to the programmable logic controller 702 via a port, the device recognition component 704 can recognize that the device 706 has been coupled to the programmable logic controller 702 and interrogate the device 706. Through such interrogation, the device recognition component 704 can determine device type, parameters associated with the device 706, and objects that can be utilized by the programmable logic controller 702 to facilitate control of the device 706.

The programmable logic controller 702 can further include a requesting component 708 that requests an object from an object library system 710 by way of the Internet 712. For instance, the device recognition component 704 can inform the requesting component 708 of an object or objects associated with the device 706, and the requesting component 708 can thereafter request such object from the object library system 710. The object can then be provided to the programmable logic controller 702 either directly or indirectly. For example, the object from the object library system 710 may first be provided to an editor, where parameters of the object can be customized for operations associated with the device 706.

Referring to FIGS. 8-11, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
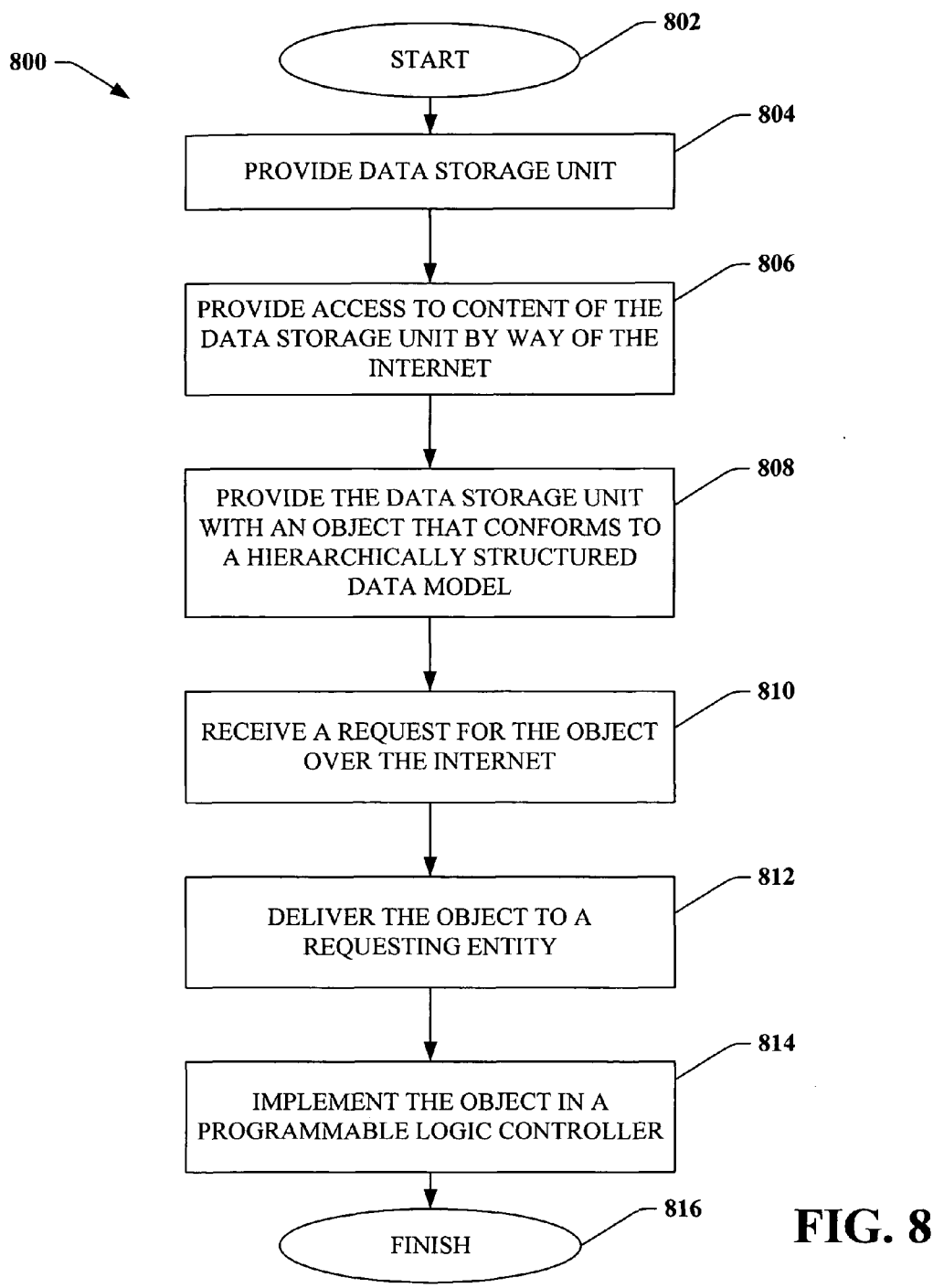
FIG. 8 is a representative flow diagram of a methodology for providing an online object library, wherein objects within the library are executable by a programmable logic controller and conform to a hierarchically structured data model.

Turning specifically to FIG. 8, a methodology 800 for providing an online library of objects that can be utilized by one or more programmable logic controllers is illustrated. The methodology 800 begins at 802, and at 804 a data storage unit is provided. At 806, access to content of the data storage unit is provided by way of the Internet. For example, the data storage unit can be communicatively coupled to a web server. At 808, the data storage unit is provided with an object that conforms to a hierarchically structured data model. As stated above, the data model can be based at least in part upon ISA S88, ISA S95, and/or a combination thereof. Furthermore, the object can be implemented by a programmable logic controller, thereby enabling programmable logic controllers to be more aware of processes and devices being controlled.

At 810, a request for the object is received over the Internet. For instance, an operator can log onto the Internet and enter a URL that directs the operator to the data storage unit. A screen can then be provided that illustrates to the operator disparate objects that are available, and the operator can request a particular object by selecting the object by way of a mouse click, voice commands, keystrokes, or the like. At 812, the object is delivered over the Internet to a requesting entity, and at 814 the object is implemented in a programmable logic controller. It is understood, however, that after delivery but before implementation, the object can be provided to an editor for customization of one or more parameters and thereafter implemented at 814. The methodology 800 completes at 816.

Figure 9:
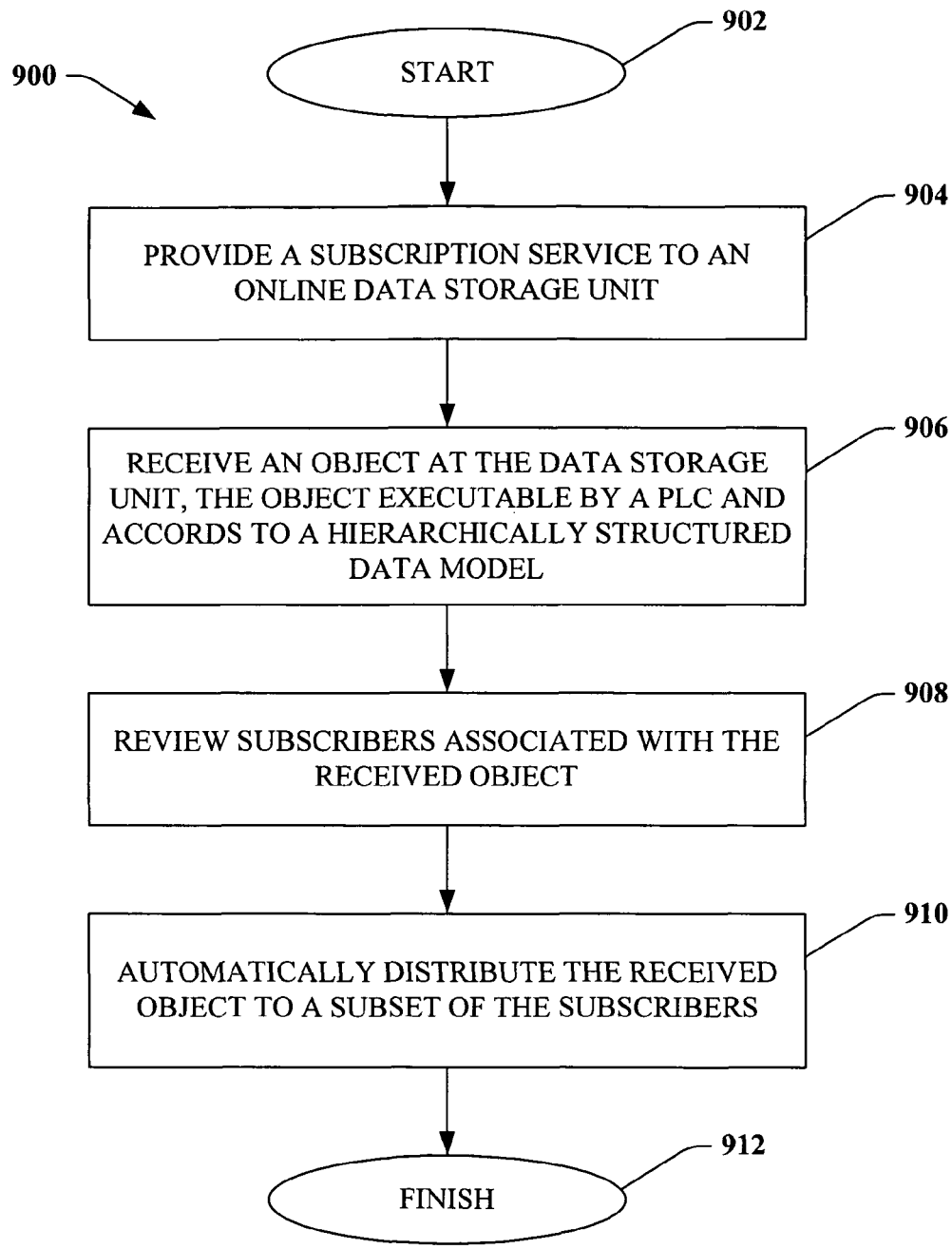
FIG. 9 is a representative flow diagram of a methodology for automatically distributing an object from within an object library to a plurality of subscribing entities.

Referring now to FIG. 9, a methodology 900 for automatically distributing an object to a plurality of subscribers is illustrated. The methodology 900 begins at 902, and at 904 a subscription service is provided to an online data storage unit. For example, an operator or company can subscribe by way of the Internet to an object distribution service. At 906, an object is received at the data storage unit. The object is designed in accordance with a hierarchically structured data model and is executable by a programmable logic controller. For instance, the programmable logic controller can execute the object in connection with controlling a device or process. At 908, subscribers associated with the received object are reviewed, and at 910 the object is automatically distributed to a subset of the subscribers. In more detail, the subscription can relate to a particular device or set of devices, and objects associated with such device(s) can be automatically distributed to the subscribers. The methodology 900 completes at 912.

Figure 10:
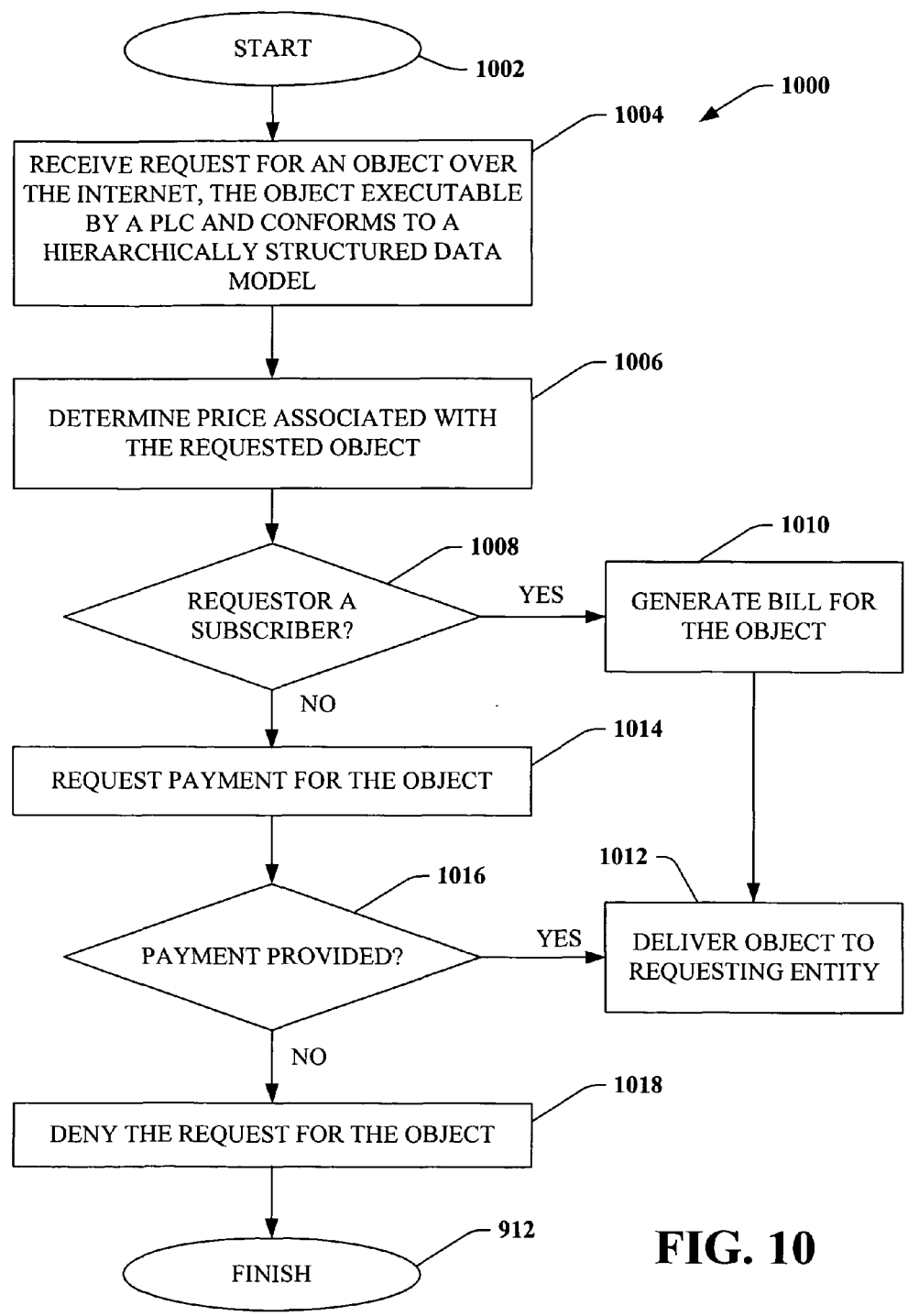
FIG. 10 is a representative flow diagram of a methodology for securing payment for an object that resides within an object library.

Now turning to FIG. 10, a methodology 1000 for distributing a control object to a requesting entity is illustrated. The methodology 1000 begins at 1002, and at 1004 a request for an object is received over the Internet, wherein the object is executable by a programmable logic controller and conforms to a hierarchically structured data model. At 1006, a price associated with the requested object is determined. For example, several objects can be available to a requesting entity, and prices amongst objects can vary. At 1008, a determination is made regarding whether the requesting entity is a subscriber. For example, subscribers can have name, location, and payment information stored at an object library, while the object library will not have information regarding non-subscribers. If the requesting entity is a subscriber, a bill for the object is generated at 1010, and at 1012 the object is delivered to the requesting entity. The bill generated at 1010 can be delivered to the requesting entity in any suitable manner (e.g., by way of email, land mail, facsimile, . . . ).

If at 1008 it is determined that the requesting entity is not a subscriber, then at 1014 payment is requested for the object. For instance, a secure payment server can be employed to receive credit card information, access to a checking/savings account, or the like. At 1016, a determination is made regarding whether payment has been provided and verified. If payment is provided, the object is delivered to the requesting entity at 1012. If it is determined that payment has not been provided, then the request for the object is denied to the requesting entity at 1018. The methodology completes at 1020.

Figure 11:
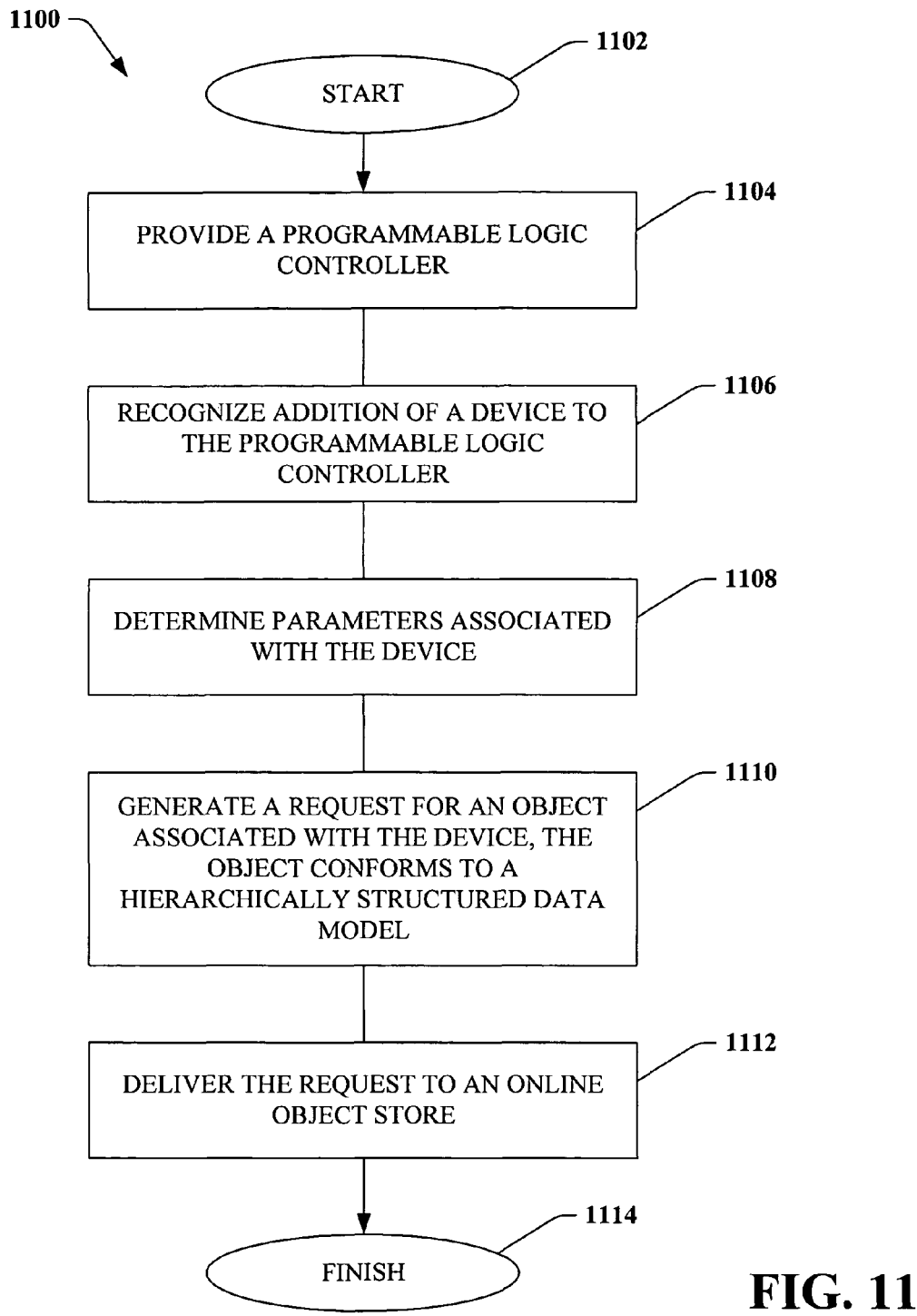
FIG. 11 is a representative flow diagram of a methodology for utilizing a programmable logic controller to automatically generate a request for an object that resides within an object library.

Now referring to FIG. 11, a methodology 1100 for providing a programmable logic controller with an object from an online data source is illustrated. The methodology 1100 begins at 1102, and at 1104 a programmable logic controller is provided. The programmable logic controller can implement objects that are hierarchically structured, as well as create and output hierarchically structured objects. At 1106, an addition of a device to the programmable logic controller is recognized. Thus, for instance, if a drive for a motor is coupled to the programmable logic controller, the controller can recognize such addition. At 1108, the controller can determine parameters associated with the added device through interrogating the device or accessing a data store that retains information relating to the device.

At 1110, a request for an object associated with the device is generated. As alluded to above, the object can conform to a hierarchically structured data model, such as one that is designed based at least in part upon ISA S95, ISA S88, and/or a combination thereof. The request can be generated based at least in part upon the parameters that were determined at 1108. At 1112, the request is automatically delivered to an online object store. The online object store can thereafter service the request and provide an editor and/or the programmable logic controller with the requested object. The methodology 1100 completes at 1114.

Figure 12:
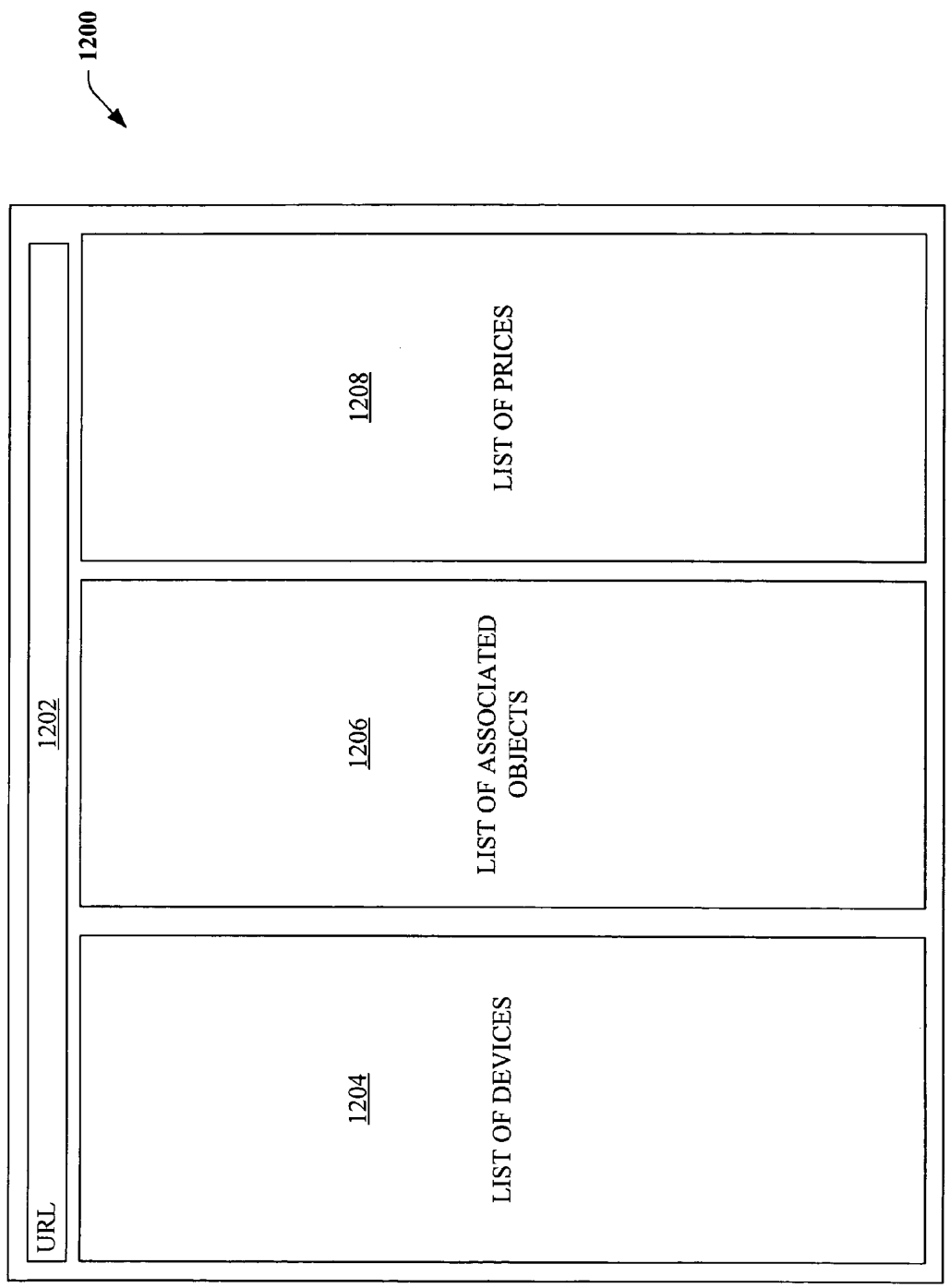
FIG. 12 is an exemplary user interface that can be employed in connection with an object library.

Turning now to FIG. 12, an exemplary user interface 1200 that can be employed in connection with one or more features described herein is illustrated. The interface includes a field 1202 where an operator can enter a URL into such field 1202. Entry of an appropriate URL into the field 1202 can cause the user interface 1200 to display a field 1204 that includes a list of devices. For instance, the list of devices can include a plurality of devices that are utilized in industrial environments, and each of such devices can be selectable by a user. Upon selection of a device from the list of devices, a field 1206 can display a list of objects that are associated with the selected device(s). Furthermore, a field 1208 can display a list of prices associated with the list of objects. An operator can then make an informed decision regarding which object to purchase/download based upon the information provided in the user interface 1200.

Figure 13:
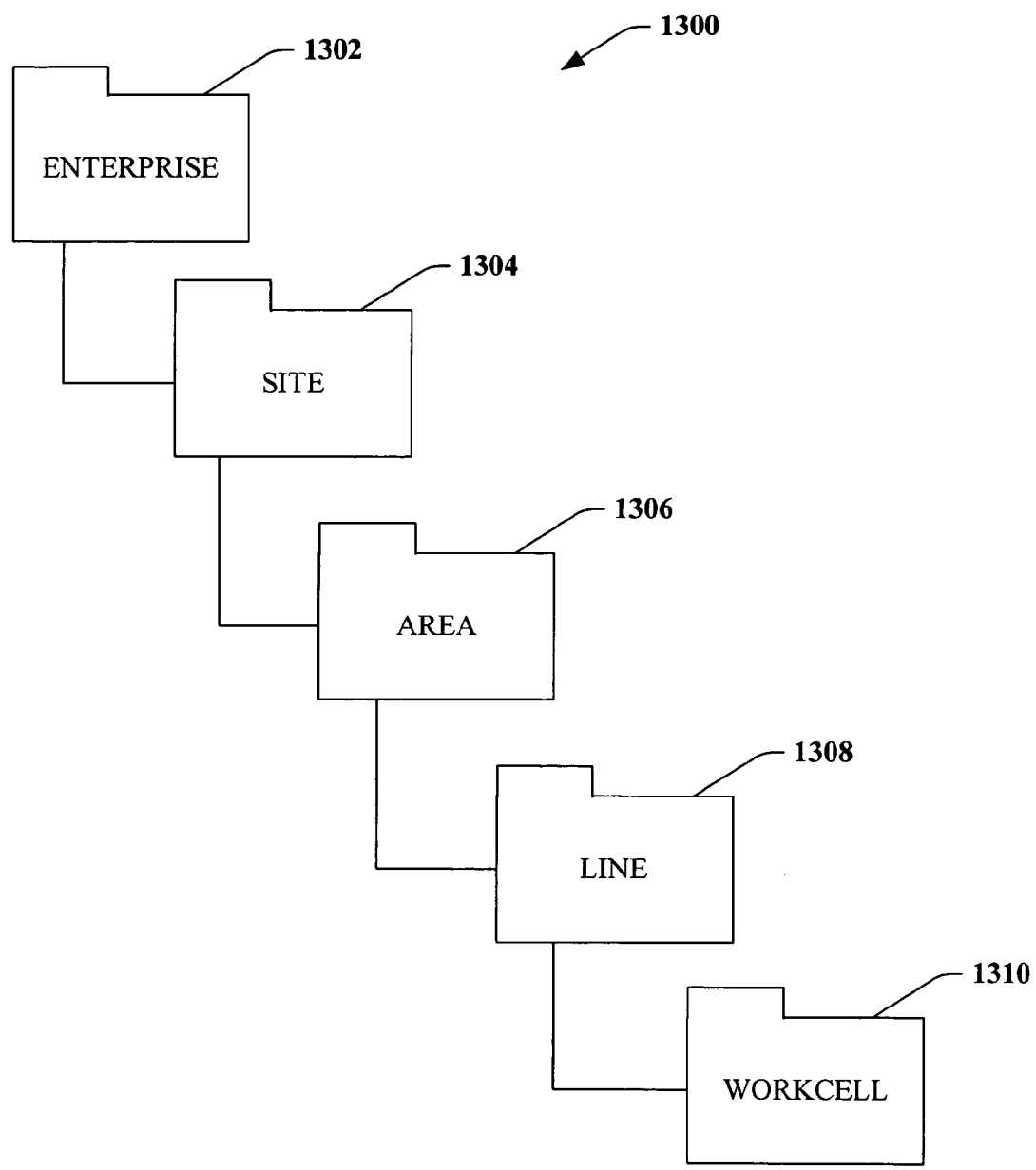
FIG. 13 is a visual representation of an exemplary structure upon which the hierarchically structured data model can be based.

Referring now to FIG. 13, an exemplary hierarchical structure 1300 which can be utilized in connection with the hierarchically structured data model described herein is illustrated. For example, the data model can facilitate nested structures, thereby mitigating deficiencies associated with data models that employ flat namespaces. The structure 1300 includes an enterprise level 1302, where a particular enterprise can be represented within data structured in accordance with a hierarchical data model. Beneath the enterprise level 1302 level can be a site level 1304, so that a particular factory (site) within an enterprise can be represented within a data packet. Beneath the site level 1304 an area level 1306 can exist, which specifies an area within the factory that relates to the data. A line level 1308 can lie beneath the area level 1306, wherein the line level 1308 is indicative of a line associated with particular data. Beneath the line level 1308 a workcell level 1310 can exist, thereby indicating a workcell associated with the data. Utilizing a nested, hierarchical data model, PLCs can become more aware of data associated therewith. Furthermore, the hierarchy 1300 can be customized by an owner of such hierarchy. For instance, more granular objects/levels can be defined within the hierarchy 1300.

Figure 14:
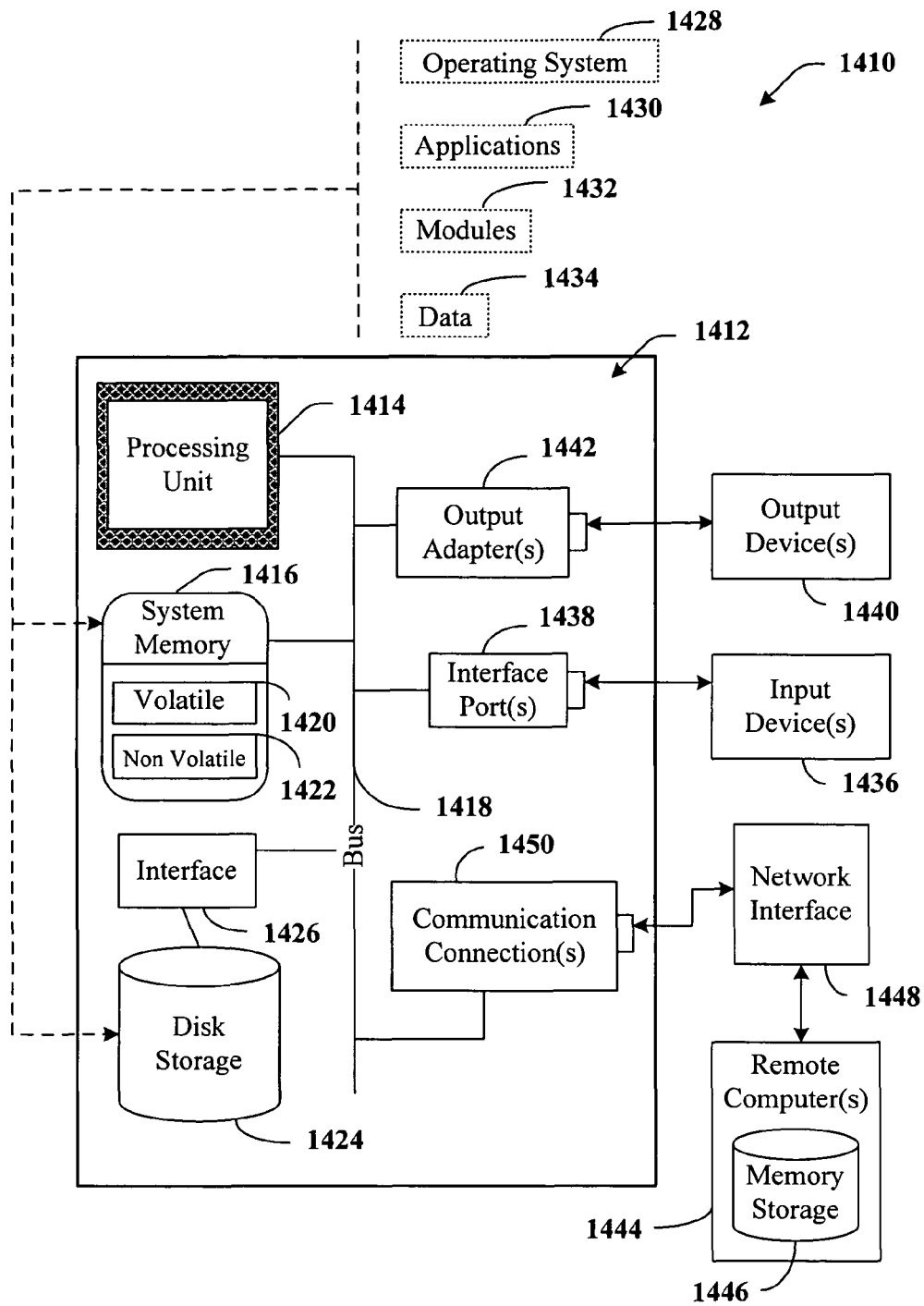
FIG. 14 is an example operating system upon which various features described herein can be implemented.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the subject invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

Figure 15:
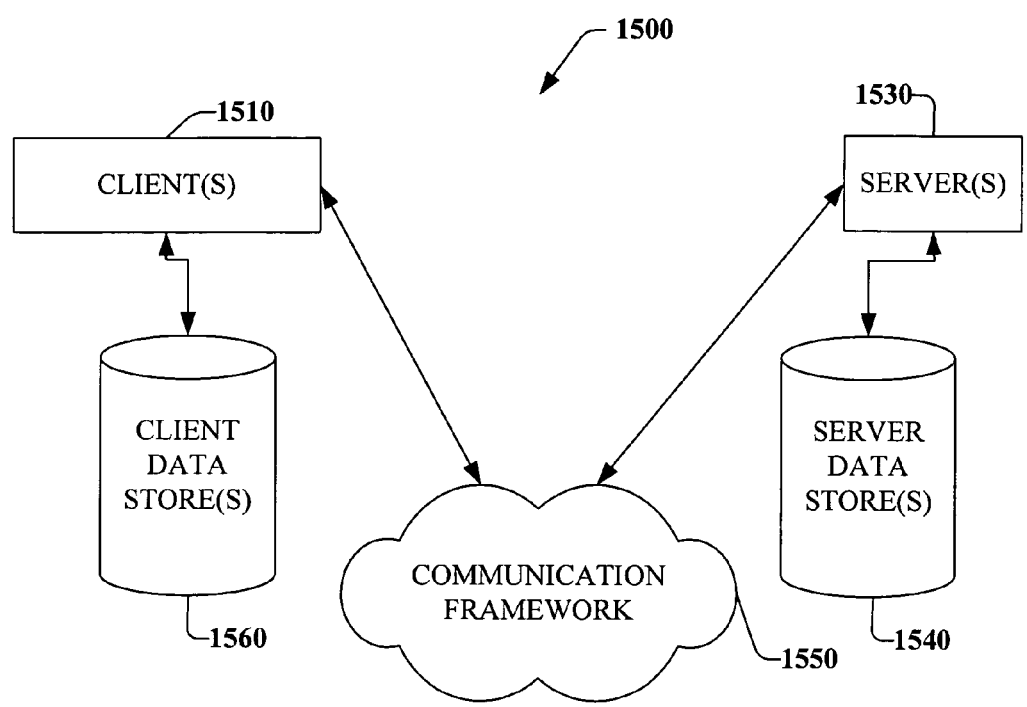
FIG. 15 is an exemplary computing environment within which various features described herein can interact.

FIG. 15 is a schematic block diagram of a sample-computing environment 1500 with which the subject invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the subject invention, for example. One possible communication between a client 1510 and a server 1530 can be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for storing an industrial automation object library comprising the following computer-executable components:
   a data store accessible by way of at least one of the Internet or an intranet, the data store retains at least one object that is executable by a controller to facilitate controlling a device or process in an industrial plant, the at least one object designed in accordance with a hierarchically structured data model, wherein the controller utilizes the hierarchically structured data model to interact with at least one of a disparate controller or a system residing at a higher level than that of the controller;
   a location component associated with the data store that accesses the data store to locate a requested object of the at least one object upon receipt of a request for the requested object; and
   a subscription component that enables at least one subscribing entity to establish a subscription to receive a subset of the at least one data object from the data store relating to control of a device specified in the subscription, the data store distributing a given object from the subset relating to control of the device to the at least one subscribing entity upon addition of the given object to the data store or upon detection of a new version of the given object.

2. The system of claim 1, further comprising a deliverance component that delivers the requested object to an entity requesting the object.

3. The system of claim 2, further comprising a sales component that collects payment for the requested object.

4. The system of claim 2, further comprising a security component that ensures that an entity initiating the request is authorized to receive the requested object.

5. The system of claim 1, the data store includes a plurality of objects.

6. The system of claim 5, further comprising an interface component that selectively filters at least one object based at least on at least one of an identity of an entity requesting review of the plurality of objects or version information associated with requested objects.

7. The system of claim 1, further comprising a detection component that recognizes at least one of when an object relating to control of the device has been added to the data store or when an updated version of an object relating to control of the device has been added to the data store.

8. The system of claim 7, further comprising:
an analysis component that determines at least one subscribing entity associated with at least one of the object added to the data store or the updated version of the object; and
a distribution component that automatically distributes the at least one of the object added to the data store or the updated version of the object to the at least one subscribing entity.

9. The system of claim 8, further comprising a scheduling component that schedules the distribution during off-peak time slots.

10. The system of claim 1, further comprising a pinging component that notifies the at least one subscribing entity of addition of an object to the data store that relates to control of the device.

11. The system of claim 1, further comprising an updating component that facilitates at least one of adding an object to the data store or modifying an object existent within the data store.

12. The system of claim 1, further comprising an encryption component that encrypts the requested object prior to communicating the requested object over the Internet.

13. The system of claim 1, further comprising a sales component that allows a defined number of accesses to the data store for a defined price.

14. The system of claim 1, further comprising a sales component that allows access to the data store to a paying entity for a defined amount of time.

15. The system claim 1, further comprising a filtering component that provides a portion of the requested object to an entity issuing the request.

16. A method for providing an object to a controller comprising the following computer-executable acts:
providing a data storage unit that is accessible by way of at least one of the Internet or an intranet, the data storage unit includes at least one object that is designed according to a hierarchically structured data model and is executable by the controller to facilitate controlling a device or process in an industrial plant, the hierarchically structured data model facilitating interaction between the controller and at least one of a disparate controller or a system residing at a higher level than that of the controller;
accepting a subscription from at least one subscribing entity to receive a subset of the at least one object relating to a first device specified in the subscription;
detecting an addition of a first object relating to control of the first device to the data store;
delivering the first object relating to the first device to the at least one subscribing entity upon detecting the addition or upon detection of a new version of the first object; and
accessing the data store to locate a requested object of the at least one object upon receipt of a request for the requested object from a requesting entity.

17. The method of claim 16, further comprising securing payment for the first object prior to delivering the first object.

18. The method of claim 16, further comprising generating a bill for the requesting entity upon receipt of the request.

19. The method of claim 16, further comprising determining that the at least one subscribing entity is authorized to receive the first object prior to delivering the first object.

20. The method of claim 16, further comprising:
detecting addition of a second device to the controller;
interrogating the device in response to the detecting to determine at least one parameter associated with the second device; and
generating a request for a second object executable by the controller to facilitate control of the second device, the request based at least in part on the at least one parameter.

21. The method of claim 16, further comprising:
determining off-peak hours with respect to the at least one subscribing entity; and
delivering the first object during the off-peak hours.

22. The method of claim 16, further comprising:
determining that an updated version of the first object has been added to the data storage unit; and
delivering the updated version to the at least one subscribing entity in response to the determining.

23. A system for storing an online library, comprising:
means for providing access to a data store by way of at least one of the Internet or an intranet, the data store includes a plurality of objects that are executable by a controller to facilitate controlling respective devices or processes in an industrial plant and are designed in accordance with a hierarchically structured data model that facilitates interaction between the controller and at least one of a disparate controller or a system residing at a higher level than that of the controller;
means for receiving a request for a first object of the plurality of objects from a requesting entity;
means for providing the first object to the requesting entity upon receipt of payment from the requesting entity;
means for receiving a subscription from at least one subscribing entity for objects relating to control of a specified device identified in the subscription;
means for automatically distributing a second object relating to control of the specified device to the at least one subscribing entity upon detecting creation of the second object in the data store; and
means for automatically distributing an updated version of the second object to the at least one subscribing entity upon detecting availability of the updated version.

24. The system of claim 23, further comprising means for ensuring that the requesting entity is authorized to access the data store prior to providing the first object to the requesting entity, such that access to the data store is a function of the requesting entity's organizational role.

25. The system of claim 23, further comprising:
means for generating a bill for the first object; and
means for delivering the bill to the requesting entity.

26. The system of claim 1, wherein the request is generated in response to detecting at the controller that a new device has been coupled to the controller, and wherein the request includes at least one device parameter determined by interrogating the new device in response to the detection.

27. The method of claim 20, further comprising:
receiving the request at the data storage unit; and
delivering the second object to the controller in response to the receiving.

28. The system of claim 23, further comprising:
means for detecting addition of a new device to the controller;
means for interrogating the new device in response to the detecting to determine at least one parameter associated with the new device; and
means for generating the request for the first object using the at least one parameter.

* * * * *